United States Patent
Stergioudis et al.

(10) Patent No.: US 11,533,330 B2
(45) Date of Patent: Dec. 20, 2022

(54) DETERMINING RISK METRICS FOR ACCESS REQUESTS IN NETWORK ENVIRONMENTS USING MULTIVARIATE MODELING

(71) Applicant: Citrix Systems, Inc., Fort Lauderdale, FL (US)

(72) Inventors: Asterios Stergioudis, Salonika (GR); Aikaterini Kalou, Patras (GR)

(73) Assignee: Citrix Systems, Inc., Fort Lauderdale, FL (US)

( * ) Notice: Subject to any disclaimer, the term of this patent is extended or adjusted under 35 U.S.C. 154(b) by 140 days.

(21) Appl. No.: 17/016,985

(22) Filed: Sep. 10, 2020

(65) Prior Publication Data

US 2021/0400075 A1 Dec. 23, 2021

Related U.S. Application Data

(63) Continuation of application No. PCT/GR2020/000034, filed on Jun. 23, 2020.

(51) Int. Cl.
*H04L 29/00* (2006.01)
*H04L 9/40* (2022.01)

(52) U.S. Cl.
CPC .......... *H04L 63/1433* (2013.01); *H04L 63/20* (2013.01)

(58) Field of Classification Search
CPC ..... H04L 63/1433; H04L 63/20; H04L 63/10; G06F 21/31; G06F 21/604
See application file for complete search history.

(56) References Cited

U.S. PATENT DOCUMENTS

| | | | | |
|---|---|---|---|---|
| 8,613,064 B1* | 12/2013 | Roy | .................. | G06F 21/316 |
| | | | | 726/7 |
| 8,904,506 B1* | 12/2014 | Canavor | ............... | H04L 29/06 |
| | | | | 713/182 |
| 9,087,187 B1* | 7/2015 | Doane | .................. | H04L 63/083 |
| 9,300,643 B1* | 3/2016 | Doane | .................. | H04L 63/08 |
| 9,424,419 B1* | 8/2016 | Kruse | .................... | G06F 21/31 |
| 10,375,095 B1* | 8/2019 | Turcotte | ................ | H04L 67/42 |
| 10,445,514 B1* | 10/2019 | Brandwine | ......... | G06F 21/6209 |
| 10,764,298 B1* | 9/2020 | Light | ..................... | H04L 63/20 |

(Continued)

OTHER PUBLICATIONS

International Search Report and Written Opinion on PCT Appl. PCT/GR2020/000034 dated Mar. 3, 2021.

*Primary Examiner* — Don G Zhao
(74) *Attorney, Agent, or Firm* — Foley & Lardner LLP

(57) ABSTRACT

Described embodiments provide systems, methods, computer readable media for determining risk metrics. A device may provide a risk model for a network environment. The risk model may include an input level and an output level. The input level may process first datasets each corresponding to a feature and a time window. The first datasets may include factors on access requests. The output level may generate a first aggregate risk metric of a first access request according to the datasets processed by the input level. The device may identify a second dataset corresponding to a second access request over the features and time windows. The device may determine a second aggregate risk metric by applying the second dataset to the risk model. The device may generate a response to the second access request according to an access control policy and the second aggregate risk metric.

20 Claims, 16 Drawing Sheets

(56) References Cited

U.S. PATENT DOCUMENTS

| | | | |
|---|---|---|---|
| 10,924,514 B1* | 2/2021 | Altman | G06N 7/005 |
| 2006/0080545 A1* | 4/2006 | Bagley | G06F 21/31 |
| | | | 713/184 |
| 2012/0167225 A1* | 6/2012 | Gomez | G06F 21/46 |
| | | | 726/26 |
| 2014/0189808 A1* | 7/2014 | Mahaffey | H04L 63/0853 |
| | | | 726/4 |
| 2015/0106239 A1* | 4/2015 | Gaddam | G06Q 20/40 |
| | | | 705/26.82 |
| 2016/0087964 A1* | 3/2016 | Irving, Jr | H04L 63/12 |
| | | | 726/4 |
| 2016/0239653 A1* | 8/2016 | Loughlin-McHugh | |
| | | | G06F 21/35 |
| 2016/0239657 A1* | 8/2016 | Loughlin-McHugh | |
| | | | G06F 21/45 |
| 2017/0006008 A1* | 1/2017 | Moran | G06F 21/31 |
| 2017/0332238 A1 | 11/2017 | Bansal et al. | |
| 2018/0046796 A1* | 2/2018 | Wright | G06F 21/45 |
| 2018/0176017 A1* | 6/2018 | Rodriguez | H04L 63/20 |
| 2018/0181964 A1* | 6/2018 | Zagarese | G06Q 20/10 |
| 2018/0288060 A1 | 10/2018 | Jackson et al. | |
| 2018/0288063 A1* | 10/2018 | Koottayi | G06F 15/76 |
| 2018/0330121 A1* | 11/2018 | Margalit | H04L 63/1408 |
| 2019/0180039 A1 | 6/2019 | Considine et al. | |
| 2019/0319961 A1 | 10/2019 | Levy et al. | |
| 2020/0153836 A1* | 5/2020 | Johnson | G06Q 30/0185 |
| 2020/0213334 A1* | 7/2020 | Kutner | H04L 63/0263 |
| 2020/0272712 A1* | 8/2020 | Pintér | G06F 21/62 |
| 2020/0280578 A1* | 9/2020 | Hearty | G06Q 50/265 |
| 2021/0326467 A1* | 10/2021 | Levy | G06F 21/6218 |

\* cited by examiner

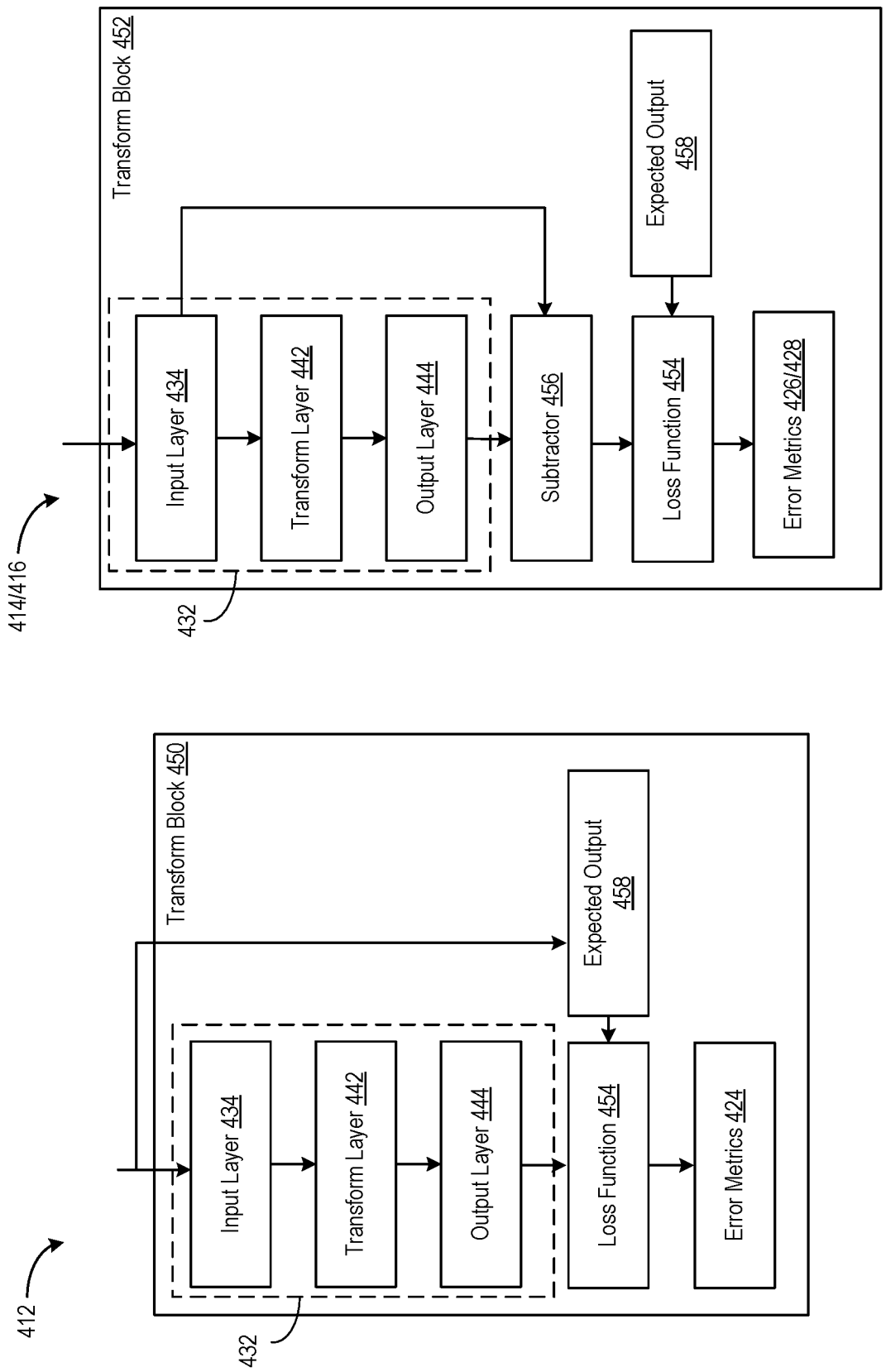

DETERMINING RISK METRICS FOR ACCESS REQUESTS IN NETWORK ENVIRONMENTS USING MULTIVARIATE MODELING

CROSS-REFERENCE TO RELATED APPLICATIONS

This application is a continuation of, and claims priority to and the benefit of International Patent Application No. PCT/GR2020/000034, titled "DETERMINING RISK METRICS FOR ACCESS REQUESTS IN NETWORK ENVIRONMENTS USING MULTIVARIATE MODELING," and filed on Jun. 23, 2020, the entire contents of which are hereby incorporated herein by references in its entirety for all purposes

FIELD OF THE DISCLOSURE

The present application generally relates to managing access, including but not limited to systems and methods of determining risk metrics from access requests.

BACKGROUND

When a client of a user is attempting to access a resource, a client may undergo an authentication during which the user is prompted to input credential information, such as an account identifier and a passcode. Upon entry, an access management system may determine whether to permit the client to access the resource by evaluating the credential information and other factors.

BRIEF SUMMARY

In responding to a request to access, an access management system may determine whether to grant an agent (e.g., executing on a client) access to a resource (e.g., hosted on a remote server) in accordance with various authentication. For instance, the access management system may perform the determination using a risk-based authentication (RBA) schema. The RBA schema may take into account a profile of the agent requesting access to the server to determine a risk profile associated with the transaction. The risk profile may then be used to determine a complexity of the challenge against which to verify the request access. A higher risk profile may lead to a stronger challenge. In contrast, a lower risk profile may be satisfied by the entry of a static account identifier and passcode. The user of the client may be challenged for additional credentials when the determined risk level is appropriate.

The RBA schema may thus be an improvement over access management systems where user accounts are created and assigned roles with each role having a set level of predefined access. For example, the risk level determined for an employee trying to access sensitive files during expected working hours via a corporate network may be low. But if the same user tried to access such files outside working hours and from outside the corporate network (e.g., at home or via a public network), the determined risk level may be relatively higher. Under access management systems that do not account for risk profile, the user may be determined to be equally risky (e.g., low risk) in both scenarios and would be allowed to access the sensitive files if the assigned role permitted such access.

Some of the drawbacks of RBA and other access management schemata may be addressed using a context access system (also referred herein sometimes as conditional access). In context access schemata, a risk score may be calculated for an access attempt based on various context related to the request. The access context may include, for example various entities such as user, device, network address (e.g., an Internet Protocol (IP) address), location, application, and time, among others. Based on the risk level and the policies defined by the system administrator, the user may then be presented with one or more authentication prompts. The authentication may include, for example, a multi-factor authentication (MFA), a password reset, and a fingerprint biometrics, among others. There may be a number of assumptions in the operations of context access systems. For example, the network may be always assumed to be hostile. External and internal threats may exist on the network at all times. Network locality may not be sufficient for deciding trust in the network. Every device, user, and network flow may already be authenticated and authorized. Policies may be dynamic and calculated from as many sources of data as possible.

As mentioned above, an access context may be jointly defined by the user, device, application, network address, location, and time. Time may be an implicit context determinant insofar as the context at a particular point in time (e.g., at the instant the access is requested) may be concerned. The other constituent components of the access context (e.g., user, device, application, network address, and location) can each have a marginal risk score and an individual trust profile, independent of the access context. Authorization may be ultimately applied to the entire context, not to individual components, but the constituent components can still have respective contributions to the overall risk. As a result, a device with a poor security profile may always have its context be restricted to a certain lower trust tier.

Using the risk score for both the overall access context and individual constituents, a policy engine (e.g., executing on the access management system) may select a policy to apply. A policy may include both logical rules similar to role-based schemas (e.g., granting users with a defined role to a specified service) and risk scores of the individual constituent factors against policy-defined thresholds. The risk scores may be ad-hoc or static (e.g., adjust risk score by a factor for a device attempting to access the service for the first time). These scores may be determined using dynamic, model-based scoring strategies (e.g., training and applying device risk models leveraging historical data).

When a user requests access to a service, the request details may be forwarded to the contextual access system. The system may take into account any rules defined by the administrator, calculate any static scores, and using the historical data may calculate model-based risk factors for each of the access context entities and the context as a whole. Based on the policies defined by the administrator of the system, the contextual access system may inform the service whether additional credentials are to be checked in determine whether to grant access. This schema may highlight the importance of an accurate model-based access context risks. In case the model provides inaccurate estimates of the involved risks, this may either increase the security risks to the company (e.g., when the model-based risks are underestimates) or may deteriorate the user's experience in accessing the service (e.g., when the model-based risk are overestimates).

From a technical perspective, the risk models may leverage machine learning or statistical analysis (e.g., in accordance with unsupervised anomaly detection techniques) to detect anomalies indicative of potential threats, risks, or other scenarios deemed valuable. For instance, a statistical model may use the number of login failures by the users to detect anomalies. If the user has failed to login successfully for an unusually high number of times in a small time interval, then this model may assign a higher risk to this particular user. This risk may then be propagated to the overall access context risk. If the same user requests access to file, based on the policies defined and the related thresholds, the user may or may not be challenged for additional credentials.

Based on these model-based scoring technique in the framework of contextual access management, there may be a set of challenges to be overcome. Firstly, other approaches for contextual access systems may utilize univariate anomaly detection algorithms. In other words, such systems may analyze each metric or feature independently from the rest of the metrics. Furthermore, these metrics are analyzed independently for each access context entity (also referred herein as a factor). This way, these systems may detect anomalous observations separately for each metrics, without taking into account the possible correlations between the various metrics. The individual univariate anomalies may then be combined post hoc using a heuristic approach to produce "multivariate" anomalies. However, the univariate approach may have significant limitations as this approach can view each feature separately and cannot detect observations that are anomalous when viewed in a multivariate way (e.g., when two or more features are all normal on their own but the combination may yield a very unusual result).

To effectuate more comprehensive evaluation of the context access entities, a multivariate anomaly detection algorithm may be employed. This new learning technique (e.g., machine learning or deep learning) may achieve better performance in anomaly detection tasks compared to univariate anomaly detection algorithms. The multivariate risk model may be able to analyze multiple input features in parallel and detect detecting unusual patterns for a user or an entity in a holistic way. Univariate approaches, in contrast, may not be able to capture a universal view of a user's or entity's behavior.

Secondly, the univariate approaches may have easy visibility and configurability, but this may be at the expense of accuracy in detecting anomalies. One of the primary reasons that contextual access systems do not leverage unsupervised multivariate anomaly detection techniques but rather use the univariate approach may be that the simplistic combination of the individual anomalies makes it trivial to interpret the supposedly multivariate anomalies. It may be easier to pinpoint which individual features were anomalous and which were not, something that facilitates the configuration of policies related to each given feature. However, this perceived ease in interpreting the output may come at the cost of decreased accuracy in the identified anomalies since these results are not multivariate anomalies in actuality.

Thirdly, these other approaches for contextual access systems may use data from a limited amount of time in performing anomaly detection. For better accuracy, the risk of each entity of the access context may be evaluated not only in the very recent past (e.g., last 5 minutes before a request was made) but may also take into account a longer time horizon. A univariate solution may look for anomalies in a static time granularity and return a risk related to that time interval. For example, the univariate approach may evaluate the risk from a number of login failures by a user in the past five minutes. This approach, however, may overlook the fact that the user had a very low risk in the past five minutes but had an extremely high risk in the past half hour. In such a scenario, the overall risk should have remained higher but under the univariate approach the risk would not be determined as such. To account for variance over time, a multivariate solution may take into consideration different time spans and combine the resulting risks into an overall risk for the entity. Moreover, this combination of risks from different time spans may take into account the historical data, rather than performed by a set of ad-hoc rules.

Fourthly, such univariate approaches for contextual access systems may employ customized heuristics instead of combining entity risks into an overall risk. Each access context entity may have a marginal risk, and these risks may be combined to determine the overall access context risk. Under univariate approaches, the individual entity risks may be combined into an overall risk using custom heuristics, such as using a weighted sum. One drawback of this approach may be that the weights are fixed and are based on the subjective and idiosyncratic opinions of the administrator that configures the custom heuristics. Another drawback may be that the approach does not take into account the historical data and any correlations that may exist among the individual entity risks. For example, when for a given request the device risk and the location risk are relatively increased, a custom heuristic may give a high overall risk. However, if the historical training data that are pre-identified as safe requests indicate that a combination of a high device risk and a high location risk is relatively common, such a custom heuristic may yield an overestimated overall risk.

In sum, these univariate anomaly detection models may be statistically optimized to detect unusual patterns on the specific metric or feature (e.g., login failures) and to a specific time horizon (e.g., aggregating login failures every five minutes). The combination of individual models across multiple features, time horizons, and entities may be performed ad-hoc using fixed, customized heuristics. To account for the drawbacks of univariate approaches, the context access system may use historical data for training to jointly optimize models across various metrics for different time horizons and all entities. The optimization may be performed in a holistic manner to detect unusual behaviors and patterns using the historical data without any manual and subjective input by the administrator. Despite the desire to build a holistic model-based risk modeling, univariate approaches may statically combine the risk models.

To address the numerous drawbacks of univariate approaches, the contextual access system may utilize a multivariate model-based scoring schema. The model may include a set of under-complete auto-encoder networks (hereinafter referred to as "AEs") for access context entities across various time horizons. The AEs may form a hierarchical structure in which output of AEs at a base level may form the input of AEs at higher levels, followed by a top-level AE to aggregate all the outputs. For each access context entity associated with a request to access a service, the AEs of the base level in the model may be used to calculate features defining behavior of the respective entity for a given time horizon. For example, each AE may determine features describing a behavior of the user in the past five minutes, such as: a number of login failures, a number of downloaded files, a number of applications used, and a number of different network addresses used to access the service. Similarly, the AEs may calculate such behavioral features for each entity. For instance, for a network address (e.g., Internet Protocol (IP) address), the model may identify the number of users accessing the source from the address and whether the address is included on a black list. In addition, for a location, the model may determine a degree of frequency across all users of an enterprise or group. The AEs at the base level in the model may also calculate features for each entity at each time horizon to define the behavior of each entity in different time horizons. The intervals and granularities of the time horizons may differ across different features or entities, and may be tailored different for various models. In addition, the number and length of time horizons may differ across features or entities.

For each entity and each time horizon, the AEs of the model may calculate a marginal risk. The marginal risks may be combined (e.g., concatenation), separately for each entity, and may be used as an input to the following set of AEs at the intermediate level. The AEs at the intermediate level may produce a risk for the whole entity, thereby combining the risks across the time horizons for the entity. The outputs of the AEs at the intermediate level may be combined (e.g., concatenation) to be used as an input to a top-level aggregator AE. The top-level AE in turn may combine the risk across the different entities and time horizons, and may generate an overall risk for the whole access context. In this manner, the multivariate model may take into account features across different time horizons to combine marginal risks into an overall risk for the entity. Moreover, the marginal entity risks are combined into an overall risk score without any subjective heuristics, but rather solely by considering the historical data and any correlations among the risks of the various entities.

One or more aspects of this disclosure is directed to systems, methods, devices, computer readable media for determining risk metrics. A device may provide a risk model for a network environment, the risk model comprising a plurality of levels. The plurality of levels may include an input level. The input level may process first datasets each corresponding to one of a plurality of features and one of a plurality of time windows. The first datasets may include factors on access requests in the network environment. The plurality of levels may include an output level. The output level may generate a first aggregate risk metric of a first access request according to the datasets processed by the input level. The plurality of levels of the risk model may be updated using the first aggregate risk metric. The device may identify, responsive to a second access request, a second dataset corresponding to the second access request over the plurality of features and the plurality of time windows. The device may determine a second aggregate risk metric for the second access request by applying the second dataset to the risk model. The device may generate a response to the second access request in accordance with an access control policy and the second aggregate risk metric.

In some embodiments, the plurality of levels of the risk model may include an intermediate level. The intermediate level may generate a plurality of risk metrics each generated according to the first datasets from one of the plurality of factors over the plurality of time windows processed by the input level.

In some embodiments, the output level of the risk model is further may generate the first aggregate risk metric using the plurality of risk metrics generated by the intermediate level. The first aggregate risk metric may be used to update the plurality of levels of the risk model through the input level, the intermediate level, and the output level.

In some embodiments, the output level of the risk model may include a subtractor configured to determine an aggregate error metric between a result generated by a set of transformation layers of the output level and an input to the set of transformation layers.

In some embodiments, the device may update, concurrent to updating the output level, the input level based at least on a comparison between (i) a result of processing a dataset of a corresponding factor of the plurality of factors and a corresponding time window of the plurality of time windows and (ii) an expected output from processing the dataset In some embodiments, the device may establish the risk model using a training dataset, the training dataset comprising metrics on access requests verified as safe for the network environment. In some embodiments, the second dataset may include second factors associated with the second access request. The second factors may include at least one of a user, a device, an application, a network address, or a location.

In some embodiments, the device may compare a first result from the output level generated by applying the second dataset to the risk model, and a second result from the output level generated by applying the first datasets, to generate an excessiveness metric. In some embodiments, the device may determine using the risk model, for a first feature of the plurality of features and for a first time window of the plurality of time windows, a contribution metric.

In some embodiments, the device may compare the second aggregate risk metric to a threshold metric defined by the access control policy. In some embodiments, the device may apply at least one of an access rule or a static score to the access control policy.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIGS. 4E-4G are block diagrams of a risk model in a system for determining risk metrics in accordance with an illustrative embodiment;

Figure 1A:
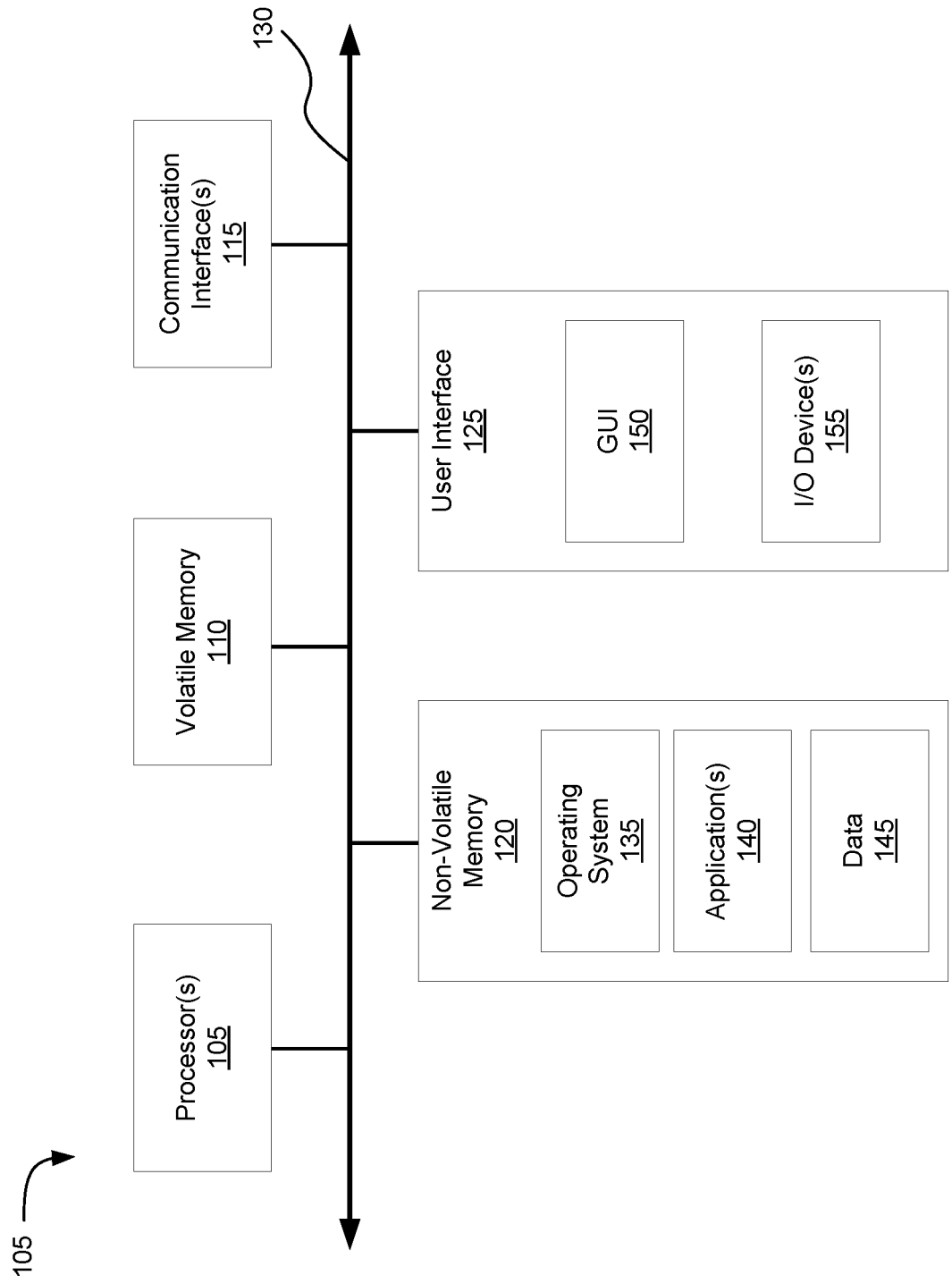
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods of determining risk metrics for access requests in network environments using multivariate modeling.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 130 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 130 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
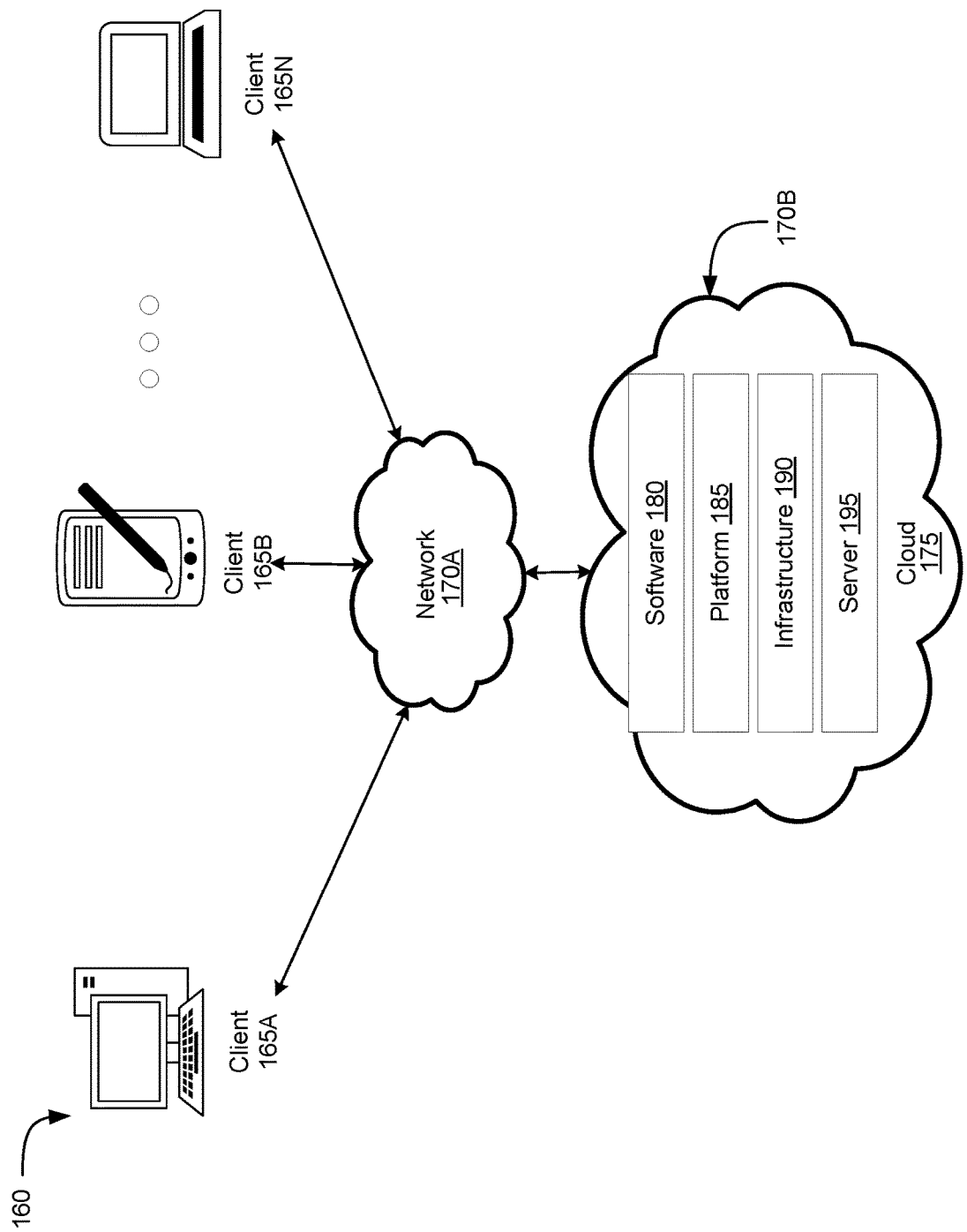
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS).

The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
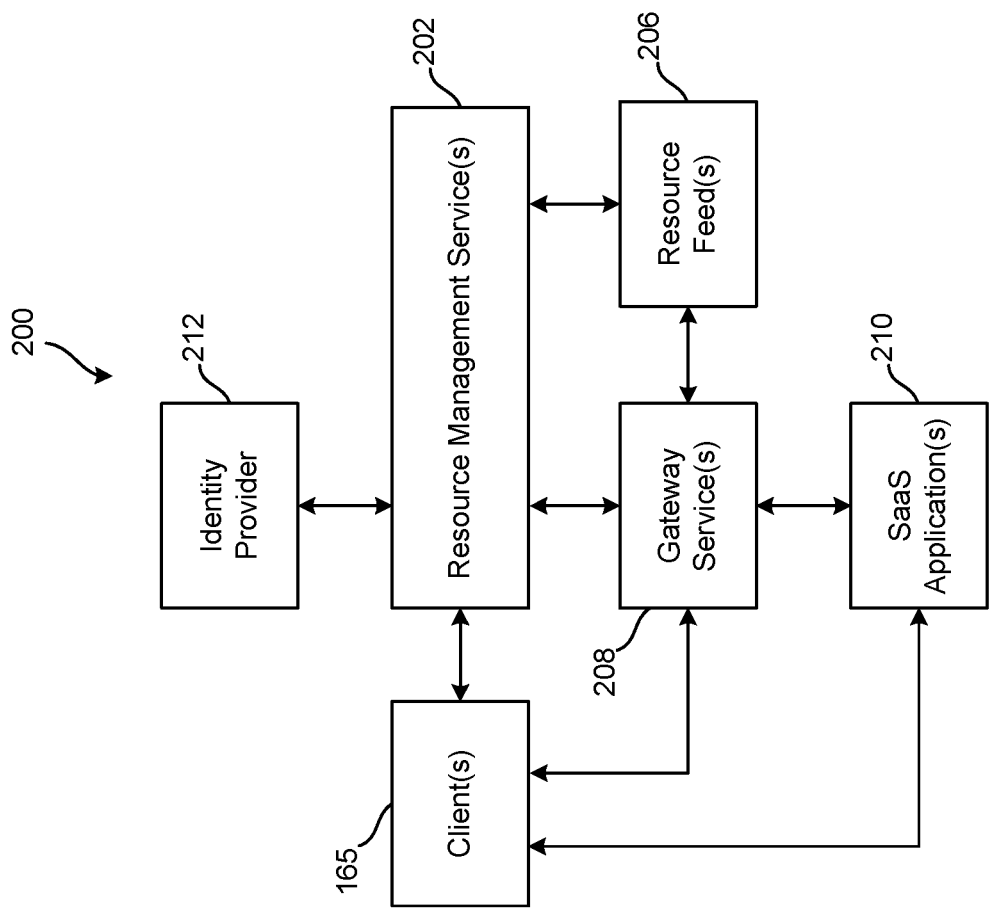
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
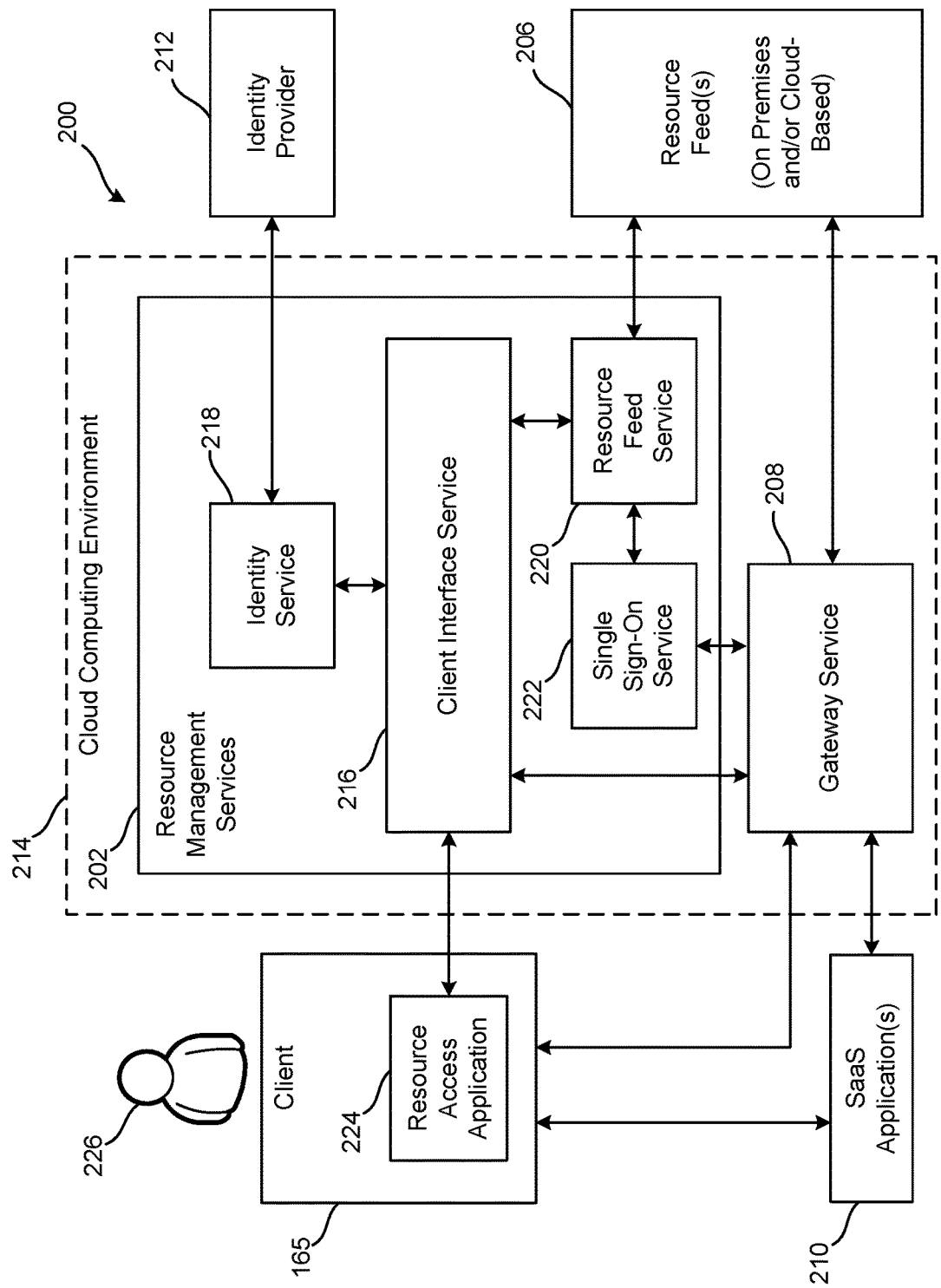
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
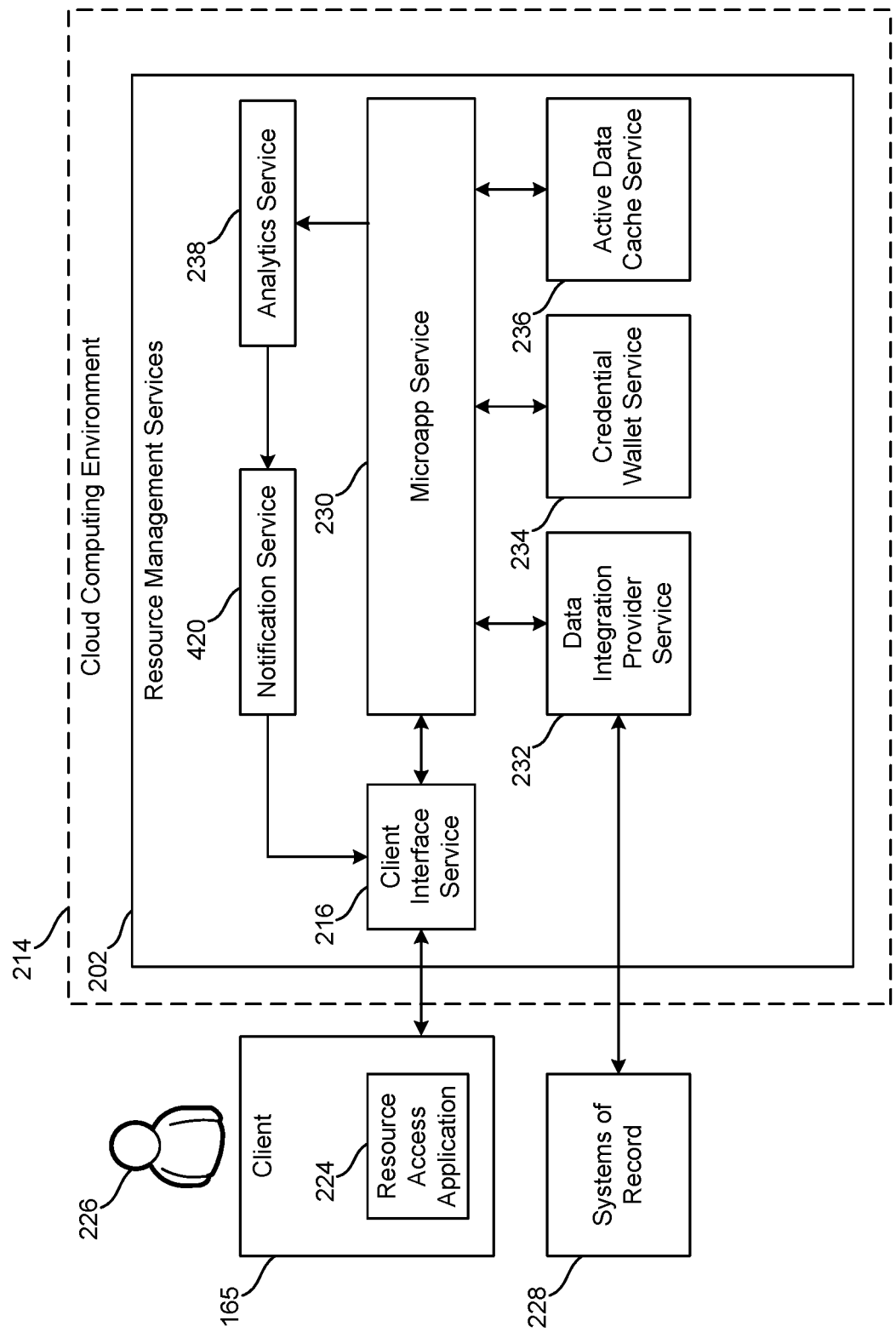
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oath2 token. The data integration provider service 232 may then decrypt the Oath2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they are looking for.

Figure 3:
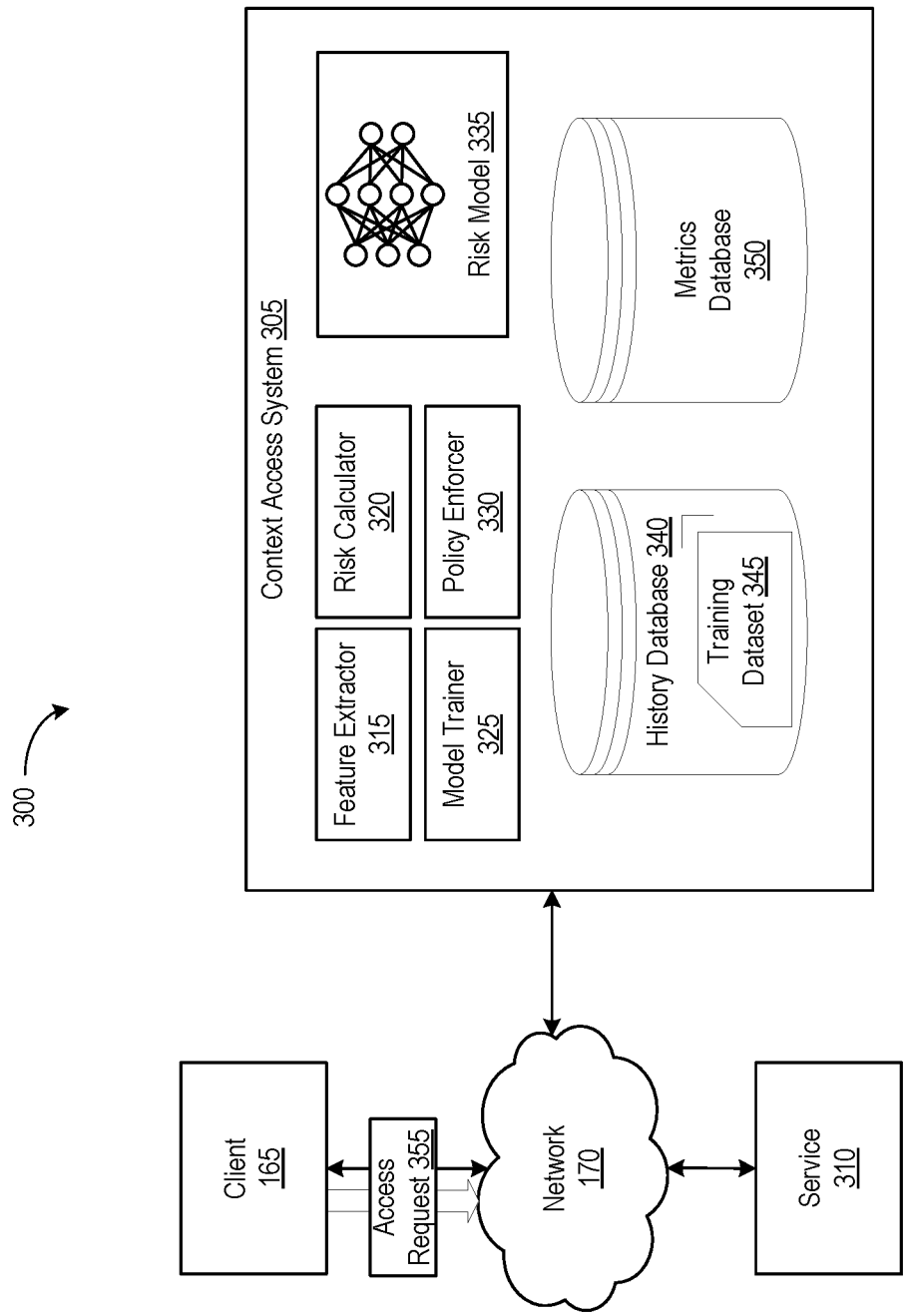
FIG. 3 is a block diagram of a system for determining risk metrics in accordance with an illustrative embodiment.

C. Systems and Methods of Determining Risk Metrics for Access Requests in Network Environments Using Multivariate Modeling Referring now to FIG. 3, depicted is a block diagram of a system 300 for determining risk metrics. In brief overview, the system 300 may include at least one client 165, at least one context access system 305, and at least one service 310 communicatively coupled with one another via at least one network 170. The context access system 305 may include at least one feature extractor 315, at least one model trainer 325, at least one risk calculator 320, at least one policy enforcer 330, at least one risk model 335, at least one history database 340, and at least one metrics database 350. The history database 340 may maintain or otherwise include at least one training dataset 345.

Each of the above-mentioned elements or entities is implemented in hardware, or a combination of hardware and software, in one or more embodiments. Each component of the system 300 may be implemented using hardware or a combination of hardware or software detailed above in connection with FIGS. 1A and 1B. For instance, each of these elements or entities can include any application, program, library, script, task, service, process or any type and form of executable instructions executing on hardware of the system 300, such as the context access system 305 (including the feature extractor 315, the risk calculator 320, the model trainer 325, the policy enforcer 330, the risk model 335, the history database 340, and/or the metrics database 350), the service 310, and the client 165. The hardware includes circuitry such as one or more processors and/or memory in one or more embodiments.

The context access system 305 (including the feature extractor 315, the model trainer 325, the risk calculator 320, the policy enforcer 330, the risk model 335, the history database 340, and/or the metrics database 350) and the service 310 may be implemented using components described in connection with FIGS. 2A-C. In some embodiments, the context access system 305 may include, correspond to, or be a resource management service 202, the gateway service 208, or the identity provider 212, or any combination thereof, among others. In some embodiments, the service 310 may include, correspond to, or be the resource feed 206 or a SaaS service 210, or any combination thereof, among others.

In further detail, the client 165 may generate and can transmit at least one access request 355 to access the service 310. For example, an application running on the client 165 in performing a requested function may attempt to access resources hosted on the service 310 (or on the network environment) by transmitting the access request 355. The access request 355 may identify the service 310 from which the resources hosted on the service 310 is to be accessed by the client 165. The access request 355 may be received by the context access system 305 or by the service 310. Upon receipt, the service 310 may forward or otherwise provide the access request 355 to the context access system 305. With provision of the access request 355, the context access system 305 may receive and can process the access request 355 to determine whether the client 165 is to have access to the resources hosted on the service 310.

Figure 4A:
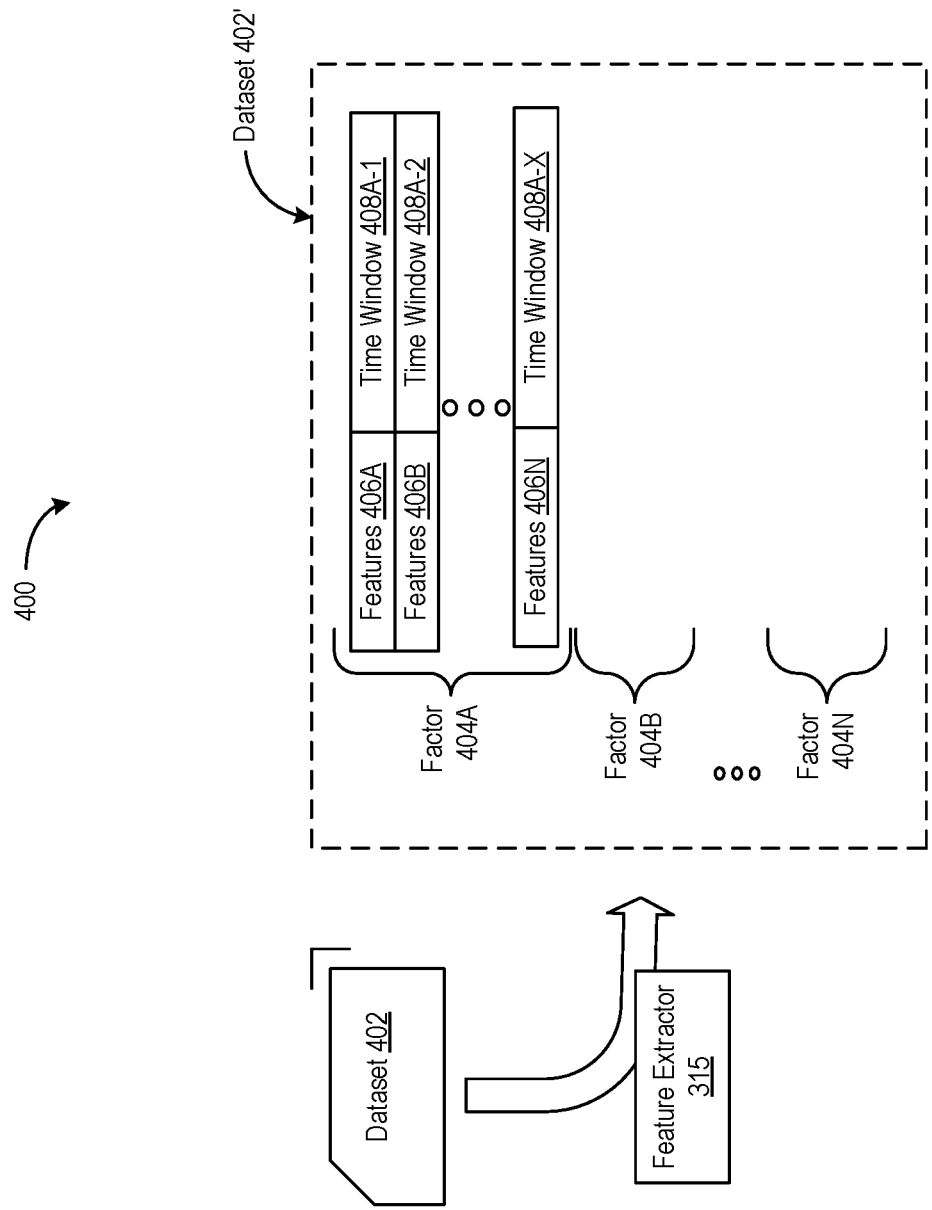
FIG. 4A is a sequence diagram of a feature extracting phase in a system for determining risk metrics in accordance with an illustrative embodiment.

Referring now to FIG. 4A, depicted is a sequence diagram of a feature extracting phase 400 in the system 300 for determining risk metrics. Under the feature extraction phrase 400, the feature extractor 315 executing on the context access system 305 may identify at least one dataset 402 from the history database 340. The dataset 402 may identify or include entries describing access history or behavior with the service 310 via the network 170. In some embodiments, the dataset 402 may include, may correspond to, or may be the training dataset 345 for training the risk model 335. The training dataset 345 may include entries verified as safe for the service 310. The feature extractor 315 may identify the training dataset 345 from the history database 340 when training the risk model 335. In some embodiments, the dataset 402 may include or correspond to entries for access history of the client 165 associated with the access request 355. The entries for access history of the client 165 (and other clients) may be monitored and maintained by the service 310. The feature extractor 315 may identify the dataset 402 including entries access history of the client 165 based on the access request 355.

Using the dataset 402, the feature extractor 315 may identify, determine, or otherwise generate at least one dataset 402'. The feature extractor 315 may parse the entries of the dataset 402 in generating the dataset 402'. In some embodiments, the feature extractor 315 may classify or assign the entries in the dataset 402 by a set of factors 404A-N (hereinafter generally referred to as factors 404), a set of features 406A-N (hereinafter generally referred to features 406), and a set of time windows 408A-1 to N-X (hereinafter generally referred time windows 408), among others. Each factor 404 (sometimes herein referred to as an access context entity or entity) may include or correspond to a type of behavior in accessing the service 310. The factors 404 may include, for example, user behavior, device behavior, application behavior, network address behavior, and location behavior, among others. Each feature 406 (sometimes herein referred to as metrics) may include or correspond to a metric falling under the respective factor 404. For example, for the user behavior as the factor 404, the feature 406 may include a number of logins by the client 165. Each time window 408 may define or identify a span of time to which the feature 406 is assigned. For example, the metrics forming the features 406 may be assigned to one of the time windows 408 based on a time stamp at which the corresponding behavior (e.g., a login attempt) is recorded or measured. The time windows 408 may divide the features 406 of the factor 404 by spans of time. In some embodiments, the span of time for the time windows 408 may vary among different factors 404.

Figure 4B:
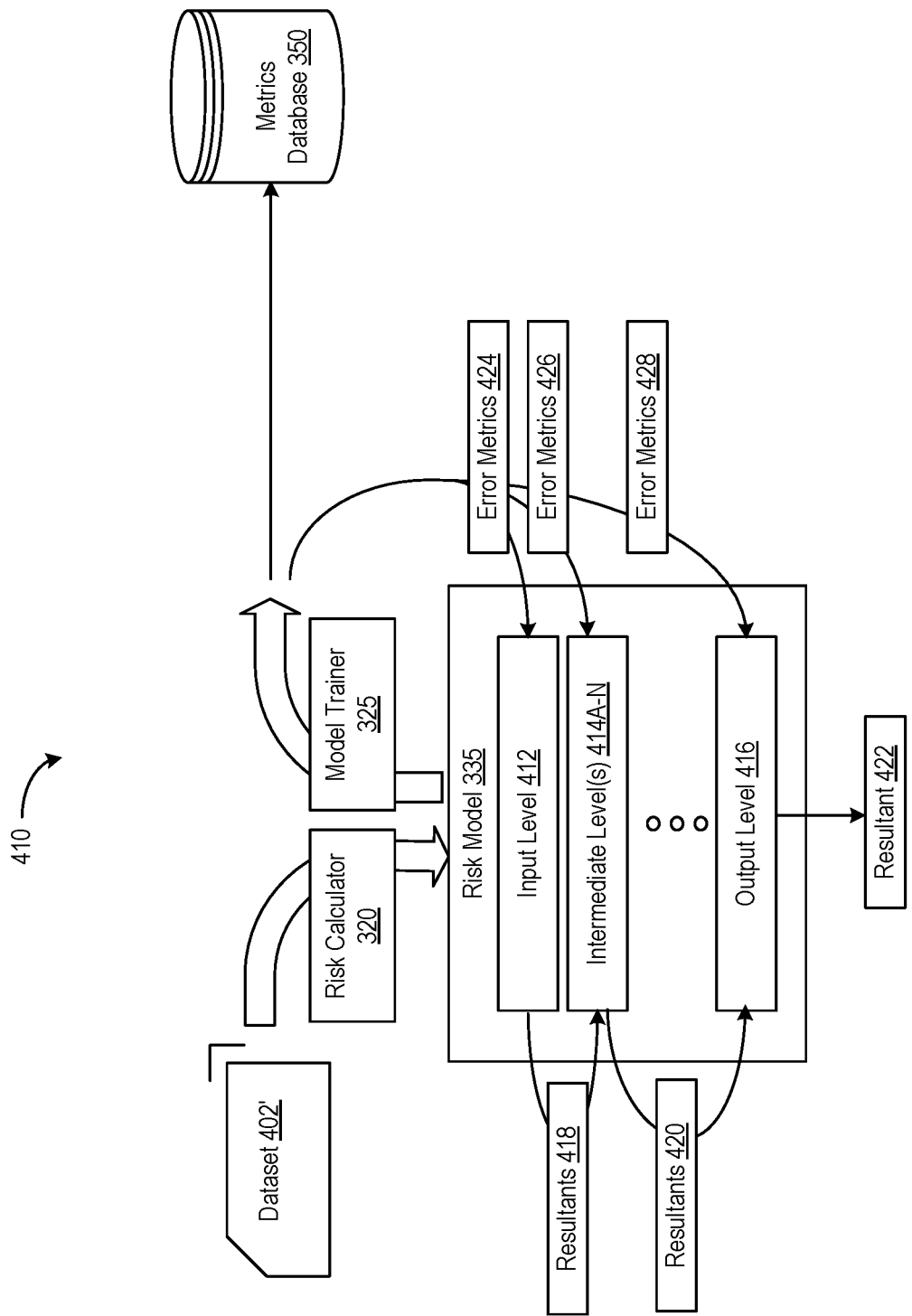
FIG. 4B is a sequence diagram of a training phase in a system for determining risk metrics in accordance with an illustrative embodiment.

Referring now to FIG. 4B, depicted is a sequence diagram of a training phase 410 in the system 300 for determining risk metrics. Under the training phase 410, the model trainer 325 executing on the context access system 305 may initiate, train, update, optimize and/or establish the risk model 335 using the dataset 402'. In some embodiments, the model trainer 325 may otherwise provide the risk model 335 to process datasets 402'. The risk model 335 may include at least one input level 412, a set of one or more intermediate levels 414A-N (hereinafter intermediate levels 414), and at least one output level 416, among others. In general, the input level 412, the intermediate level(s) 414, and the output level 416 of the risk model 335 may each include a set of transform layers for processing the input arranged in a hierarchical manner. The set of transform layers may include one or more parameters, and may reduce the dimensionality and reconstructing of the input, and may comprise, for example, an under-complete, auto-encoder network, among others. The dataset 402' and any resultants (e.g., output or results, such as metrics or scores) may be fed through the risk model 335 from the input level 412, to the intermediate level 414, and then to the output level 416. Details of the functionalities and the structure of the risk model 335 are provided herein in conjunction with FIGS. 4C-4F.

In establishing the risk model 335, the risk calculator 320 (or the model trainer 325) may apply the dataset 402' to the risk model 335. In applying the dataset 402' to the risk model 335, the risk calculator 320 may process the dataset 402' in accordance with the input level 412, the intermediate level 414, and the output level 416 of the risk model 335. The risk calculator 320 may input the dataset 402' into the input level 412 of the risk model 335 and generate a set of resultants 418 (also referred herein as marginal risk metrics or scores) from the processing by the input level 412. The input level 412 may process the features 406 of the dataset 402' over each factor 404 and each time window 408. The risk calculator 320 may input the resultants 418 from processing of the dataset 402' by the input level 412 to the intermediate level 414 to generate another set of resultants 420 (also referred herein as entity risk metrics or scores). The intermediate level 414 may process the resultants 418 from the input level 412 individually for each factor 404 over the time windows 408 for the factor 404. The risk calculator 320 may input the resultants 418 from the intermediate level 414 to the output level 416 to generate at least one output resultant 420. The output level 416 may process the resultants 420 over the factors 404 and the time windows 408 to generate at least one resultant 422 (herein also referred to as an overall risk score or aggregate risk metric or score). In some embodiments, the model trainer 325 may store and maintain the resultants 418, 420, and 422 onto the metrics database 350. In some embodiments, the model trainer 325 may associate the resultants 418, 420, and 422 with the dataset 402', and may store and maintain the association on the metrics database 350.

The model trainer 325 may compare the resultants 418, 420, and 422 with reference values to update the input level 412, the intermediate level 414, and the output level 416 of the risk model 335 based on the comparison. In comparing, the model trainer 325 may calculate, determine, or generate error metrics 424 for the input level 412, error metrics 426 for the intermediate level 414, and error metrics 428 for the output level 416. Each metric 424, 426, and 428 may indicate or correspond to a degree of deviation from the reference values or expected outputs (e.g., the reconstruction of the input). In some embodiments, the metrics 424, 426, and 428 may be calculated using a loss function, such as a mean absolute error (MAE), a root-mean-square error (RMSE), and mean squared error (MSE), among others. The model trainer 325 may compare the resultant 418 from the input level 412 with an expected output to generate the error metrics 424. For the input level 412, the excepted output may correspond to at least a portion of the dataset 402' fed through the input level 412 of the risk model 335. The model trainer 325 may compare the resultant 420 from the intermediate level 414 with reference values to generate the error metrics 426. In some embodiments, the reference values for the intermediate level 414 may be the resultant 418 from the input level 412. In some embodiments, the reference values for the intermediate level 414 may be predetermined (e.g., such a null matrix). The model trainer 325 may compare the resultant 422 from the output level 416 with reference values to generate the error metrics 428. In some embodiments, the reference values for the intermediate level 414 may be the resultant 420 from the intermediate level 414. In some embodiments, the reference values for the intermediate level 416 may be predetermined (e.g., such a null matrix). In some embodiments, the model trainer 325 may store and maintain the error metrics 424, 424, or 428 onto the metrics database 350. In some embodiments, the model trainer 325 may associate the resultants 418, 420, and 422 with the dataset 402', and may store and maintain the association on the metrics database 350.

With the generation of the error metrics 424, 426, and 428, the model trainer 325 may modify or otherwise update the risk model 335. The model trainer 325 may optimize the input level 412, the intermediate level 414, and the output level 416 (collectively the set of levels) of the risk model 335 from end-to-end. The levels in the risk model 335 may be in accordance with optimization for auto-encoder networks. Using the error metrics 428, the model trainer 325 may update the output level 416 (e.g., one or more weights of the output level 416). Using the error metrics 426, the model trainer 325 may update the intermediate level 414 (e.g., one or more weights of the intermediate level 414). In some embodiments, the model trainer 325 may also use the updated error metrics from the output level 416 to update the intermediate level 414. In addition, using the error metrics 424, the model trainer 325 may update the input level 412 (e.g., one or more weights of the input level 412). In some embodiments, the model trainer 325 may also use the updated error metrics from the intermediate level 414 or the output level 416 to update the input level 412. The input level 412, the intermediate level 414 and/or the output level 416 can accordingly be updated, trained and/or optimized in parallel or in an end-to-end fashion.

In regards to the training dataset 345, before training the risk model 335, the data may be collected by monitoring the service 310. The applicable factors may be identified, and the data can be generated for each factors. In addition, the granularities in time may be defined, and may differ among the entities. The definition may be applied for each dataset 402 retrieved in response to each access request 355 determined to be non-malicious. For each access request 355, the features and metrics may be determined for each entity and each time granularity. Upon verification and definition, the dataset 402 may then be used to train the risk model 335 end-to-end. Once the training process 400 is completed, additional data may be collected to calculate the excessiveness metrics.

With the training of the risk model 335, the feature extractor 315 may determine or generate the input features (e.g., dataset 402') for each new access request 355 in the same manner as the training dataset 345. For example, if factors 404 using the last N minutes before each request were used during training, in the inference phase, the feature extractor 315 may use a rolling time window 408 of the same length to determine the same factors 404. The risk calculator 320 may pass the dataset 402' through the trained risk model 335. The contribution metrics may be determined by the risk calculator 320 directly using the outputs of the risk model 335. For excessiveness metrics, the risk calculator 320 may leverage statistics collected from the training process 400. All of the outputs from the risk model 335 may be sent to the policy enforcer 330. The policy enforcer 330 may take into account the rest of the information available (e.g., from logical rules and static scores), may determine what actions should be applied.

Figure 4C:
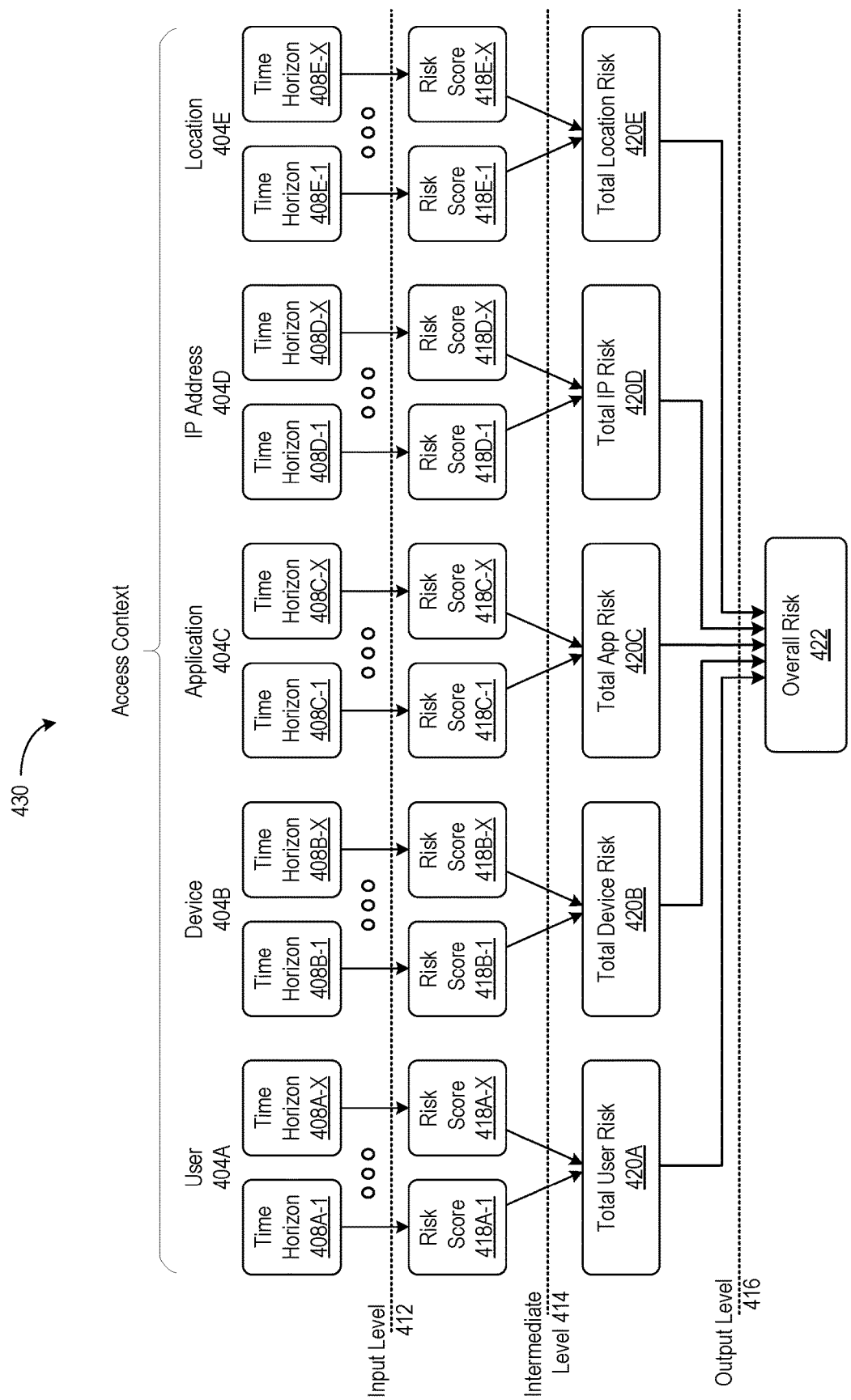
FIG. 4C a block diagram of example access context fed through the risk model of the system for determining risk metrics in accordance with an illustrative embodiment.

Referring now to FIG. 4C, depicted is a block diagram of example access context 430 fed through the risk model 335. As illustrated, for each entity 404A-E of the access context 430, the feature extractor 315 may generate features 406 describing the behavior of the respective entity 404A-E for a given time window 408A-1 to E-X. For instance, the feature extractor 315 may generate features 406 describing the behavior of the user in the past five minutes, such as how many login failures they had, how many files they downloaded, how many apps they used, how many different IPs they accessed the service from. Similarly, the feature extractor 315 may generate behavioral features for each entity 404A-E. For an IP address, the feature extractor 315 can calculate the number of users accessing the service from the client 165 or whether the client 165 is included in a blacklist. For a location, the feature extractor 315 can calculate how common the location is across all users of an organization. For each entity 404A-E, the feature extractor 315 can determine such features 406 in several time windows 408A-1 to 408E-X to describe the behavior of each entity 404A-E in different time intervals. The exact definition of the number of such intervals and the specific description of the time granularities as well as the factors (or features) can be tailored to each specific system. The number of the time windows 408 used as well as the length may differ across various entities 404A-E.

At the input level 412 of the risk model 335, the risk calculator 320 may use a set of transform layers (e.g., auto-encoders) to calculate risk score 418A-1 to 418E-X (sometimes referred to as marginal risk scores) of each entity 404A and for each time horizon 408A-1 to 408E-X. At the intermediate level 414, the risk calculator 320 may concatenate the risk scores 418A-1 to 418E-X for each entity 404A-E, and can use another set of transform layers to calculate risk scores 420A-E for each entity 404A-E across all the time windows 408A-1 to 408E-X. The combination of the risk scores 418A-1 to 418E-X to generate the total entity risk scores 420A-E for the whole entity 404A-E, effectively combining the risk scores 418A-1 to 418E-X of each different time horizon 408A-1 to 408E-X. The output of the transform layers of the intermediate level 414 may be again concatenated and may be used input to the set of transform layers of the output layer 416. The output layer 416 may then combine and produce the aggregate risk metric 422 for the whole access context 430.

Figure 4D:
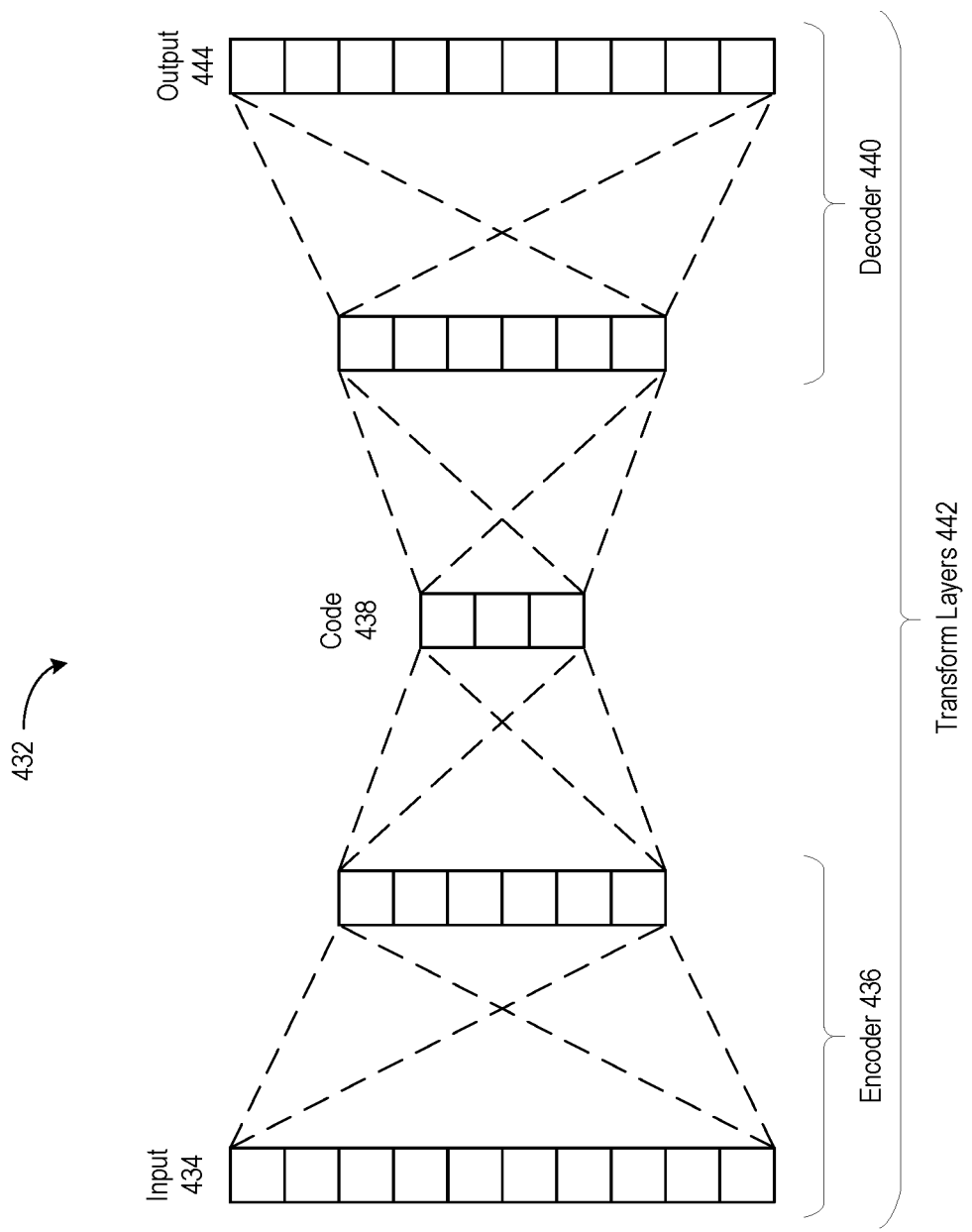
FIG. 4D a block diagram of an autoencoder in any layers of a risk model in the system for determining risk metrics, in accordance with an illustrative embodiment.

Referring now to FIG. 4D, depicted is a block diagram of a transform blocks 432 in the input layer 412, intermediate layer 414, or the output layer 416 in the risk model 335 of the system 300 for determining risk metrics. In some embodiments, the auto-encoder 432 may be a feed-forward multilayer neural network to reproduce data from an input 434 at the output 444. The resolution (e.g., number or input units) at the input 434 may be the same as the resolution (e.g., number or output units) at the output 444. The auto-encoder 432 may be trained by the model trainer 325 using the backpropagation algorithm against a loss function. To ensure that the auto-encoder 432 does not replicate the identity function, the auto-encoder 432 may be undercomplete to create constraints on the copying task by constraining the hidden transform layers 442 to have a smaller resolution than those of the input 434 and the output 444.

The auto-encoder 432 may include at least one encoder 436 and at least one decoder 440, collectively referred to as the set of transform layers 442. The auto-encoder 432 may also include a loss function (not depicted). The auto-encoder 432 may compress data from the input 434 into a lower-dimensional code 438 using the encoder 436 and then reconstruct the input 434 from the code 438 at the output 444 using the decoder 440. The weights between the various layers 442 of the auto-encoder 432 may be optimized via backpropagation in order to minimize the loss function. The loss function may be minimized when the loss between the input 434 and the output 444 is as small as possible.

The auto-encoder 432 may be used as unsupervised multivariate anomaly detection algorithms in several use cases such as network intrusion, fraud detection, and systems monitoring, among others. The auto-encoder 432 may be trained to minimize the loss function (e.g., the reconstruction error) between the input 434 and the output 444 which may include feature vectors representing legitimate transactions. If there is a new input, the data from the new input 434 may be run through the transform layers 442 of the auto-encoder 432 to obtain a reconstruction of the data at the output 444. The reconstruction error may be calculated between the input 434 (which is the expected output) and the actual output 444. The data may be considered as anomalous if the reconstruction error is higher than a threshold which has been optimized using historical data (e.g., the training dataset 345). The intuition may be that legitimate transactions may have low reconstruction errors (since the auto-encoder 432 was trained to accurately reconstruct them) while anomalous transactions can have higher errors.

When the auto-encoder 432 is trained on a given dataset (e.g., the training dataset 345), the auto-encoder 432 may adapt weights as to minimize the selected loss function between the input 434 and the output 444. In the case of the auto-encoders 432, the output data may be the same with the input data. One of the major challenges of utilizing unsupervised multivariate anomaly detection algorithms instead of univariate ones may include interpretability. The unsupervised multivariate anomaly detection algorithm may not provide any intrinsic indications regarding the underlying reasons that a certain observation was regarded as anomalous or not. But the reconstruction error of the auto-encoder 432 can be leveraged in order to understand which input features were anomalous and which were not. If there is new data at the input 434, the data may be run through the auto-encoder 432 to obtain a reconstruction of the new data at the output 444. The reconstruction error may be calculated between the input 434 and the output 444 on a per-feature 406 basis. The features 406 with the highest absolute errors may correlate with those contributing the most to the multivariate anomaly. In this manner, a black-box auto-encoder 432 can be turned into an interpretable unsupervised anomaly detector.

Figure 4E:
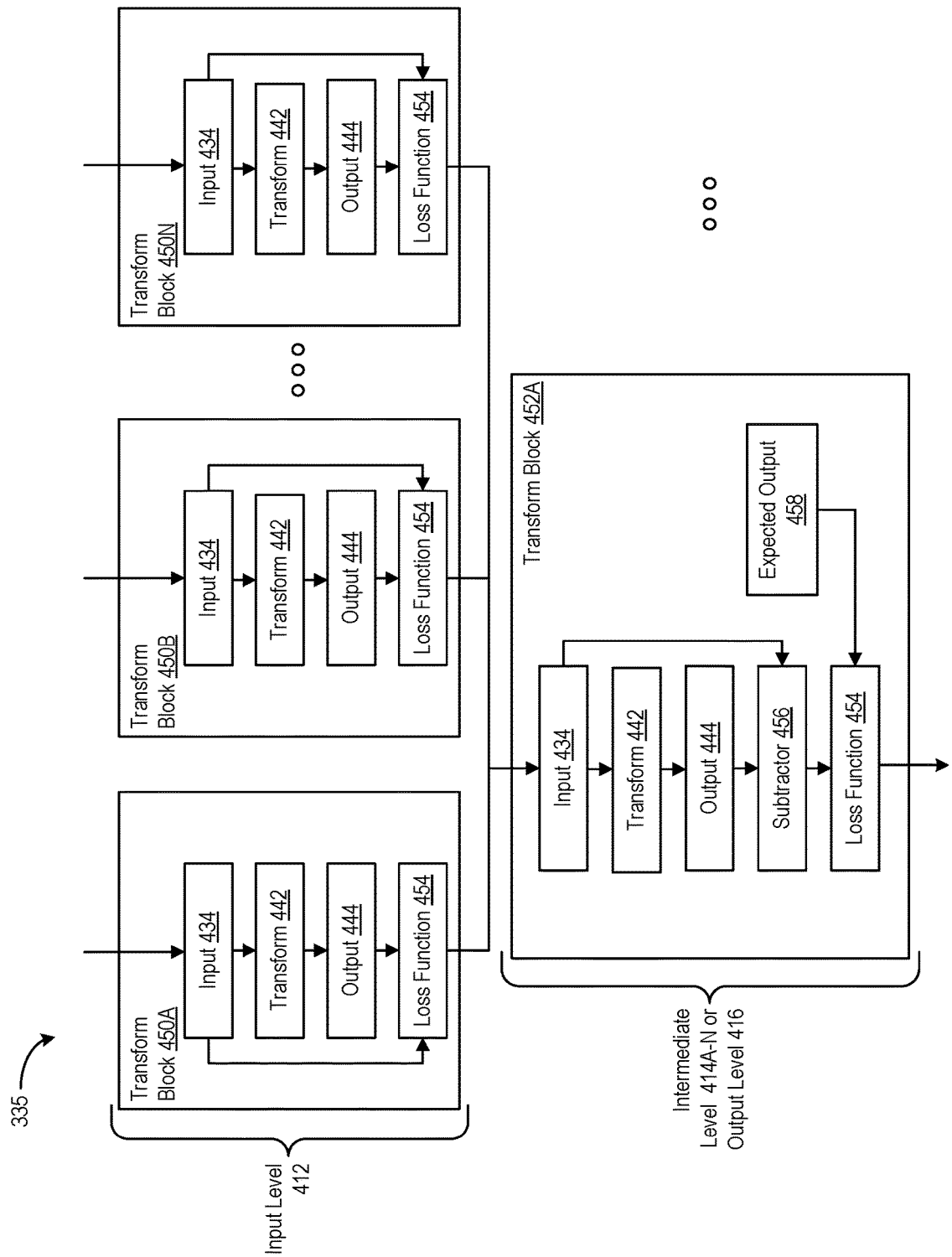

Referring now to FIGS. 4E-4G, depicted are block diagrams of the risk model 335 and the components therein of the system 300 for determining risk metrics. In training the auto-encoders 432 of the risk model 335, one approach may include combining these auto-encoders 432 for training, or to train each of the auto-encoders 432 at each level 412, 414, or 416 separately. Then, the training data 345 may be passed through the trained auto-encoders 432 and the reconstruction errors (e.g., MAE) from the processing may be determined. The reconstruction errors may be concatenated or combined, and then used to update or optimize the auto-encoders 432 at the input level 412. The reconstruction errors may then be passed through the auto-encoders 432 at the input level 412 to obtain an entity-level reconstruction error (e.g., MAE). The entity-level reconstruction error may serve as input to the auto-encoders 432 at the intermediate level 414 and the output level 416, and trained accordingly. One benefit from this approach may be that the input features are pre-calculated for the auto-encoders 432 at the input level 412 before the auto-encoders 432 for the intermediate level 414 or the output level 416 are trained.

This approach, however, may produce auto-encoders 432 where each one may be optimized on a specific factor 404 and time horizon 408. The risk scores of these auto-encoders 432 may be combined using a model-based approach, but the approach may not negate the fact that the auto-encoders 432 are optimized separately from each other. In turn, this may result in a final solution that is a combination of individually-optimized models. This may be in contrast to a model truly optimized end-to-end and exploiting all the correlations among all input features of all levels of the described hierarchy.

To overcome these shortcomings, the auto-encoder models 432 may be arranged in a hierarchical combination as a single end-to-end deep learning model that is jointly optimized across all different time windows 408 and factors 404 without intermediate steps of layer-wise or level-wise training. In the risk model 335, the input level 412 may include a set of transform blocks 450A-N (hereinafter generally referred to as transform blocks 450). The intermediate level 414 and the output level 416 each may include another set of transform blocks 452A-N (hereinafter generally referred to as transform blocks 452). As depicted, each transform block 450 of the input level 412 may include one or more components of the auto-encoder 432, such as the input 434, the transform layers 442 (including the encoder 436 and the decoder 440), the output 444, and the loss function 454. Each transform block 452 of the intermediate level 414 or the output level 416 may include one or more components of the auto-encoder 432, such as the input 434, the transform layers 442 (including the encoder 436 and the decoder 440), the output 444, and the loss function 454. In addition, each transform block 452 may include at least one subtractor 456 and expected output 458, among others.

One challenge in this end-to-end training approach may include defining the expected outputs for each auto-encoder 432. With the layer-wise training approach described above, the reconstruction error may be computed using the input at each auto-encoder 432, and then these errors can be used as inputs and as expected outputs of the next levels of auto-encoders 432. In the case of end-to-end optimization, the expected output may not be known a priori, and the expected output may not be explicitly defined as the input received from the previous level. To overcome this issue, the risk model 335 may rely on the fact that the objective of the auto-encoders 432 at each of the levels 412, 414, and 416 is to replicate the input 434 at the output 444. In other words, the auto-encoders 432 may be to trained to minimize the difference (as calculated using the loss function 454) between the input 434 and the output 444.

At the input level 412, the difference between the input 434 and the output 444 may be minimized to zero, with the input 434 used as the expected output 458, to calculate the error metrics 424. At the intermediate level 414 and the output level 416, instead of minimizing the difference between the input 434 and the output 444, the auto-encoders 432 of the transform blocks 452 may be trained to minimize the difference between a difference of the input 434 and the output 444 versus the expected output 458, such as a matrix of predefined values (e.g., a matrix of zeroes). The difference between the input 434 and the output 444 may be calculated using the subtractor 456. The resultant of the subtractor 456 may be compared against the expected output 458 via the loss function 454.

The loss function 454 in the transform blocks 450 or 452 may use the following mean absolute error (MAE) equation, for example:

$$\frac{1}{n}\sum_{i=1}^{n}\left(\frac{1}{m}\sum_{j=1}^{m}|\text{expected\_output}^j - \text{real\_output}^j|\right)$$

where:

expected_output$^j$ = input$^j$ and real_output$^j$ = output$^j$ = $f$(input$^j$)

For the loss function 454 in the transform block 452 of the intermediate level 414 or the output level 416, the expected output may not be known beforehand, but the difference between the input 434 and the output 444 is to be as close to zero (or another defined value) as possible. The transform block 452 may incorporate or include the subtractor 456 to determine or calculate the difference between the input 434 and the output 444. The loss function 454 of the transform block 452 may then compare the difference between the input 434 and the output 444 against the expected output 458 to calculate the error metrics 426 or 428. In some embodiments, the expected output 458 of the transform block 452 may be a predetermined value (e.g., a matrix of noise or zeroes). The expected output 458 may be defined as a matrix of zeros with the same resolution as the input 434. The MAE equation may be subject to the modified constraints for the intermediate level 414 and the output level 416, for example, of the following form:

expected_output$^j$=0 and real_output$^j$=(output$^j$−input$^j$)=($f$(input$^j$)−input$^j$)

Using the subtractor 456 and the expected output 458 as defined above, the auto-encoders 432 may be trained as a single end-to-end model, jointly optimized across access context entities, across time windows 408 and across input features 406. The risk model 335 may be optimized in order to minimize both the individual error metrics 422, 424, and 426 of each auto-encoder 432 but also of the error metrics 424 and 426 of the higher levels, the intermediate level 414 and output level 416. In this manner, the error metrics 428 calculated at the output level 416 may be propagated to the lower levels, such as the intermediate level 414 and the input level 412. By propagating, the weights in the auto-encoders 432 may be modified to reduce the error metrics 428 while minimizing the error metrics 424 and 426 as low as possible at the same time.

As depicted in FIG. 4E, the risk model 335 may include the transform blocks 450 and 452 in a hierarchical manner. As illustrated in FIG. 4F, for the transform block 450 at the input level 412, the expected output 458 may be defined to be the data at the input 434. The error metrics 424 (e.g., MAE) may be calculated by the loss function 454 between the input 434 and the output 444. As depicted in FIG. 4G, for the transform block 452 at the intermediate level 414 or the output level 416, the error metrics 426 or 428 may be calculated by the loss function 454 between the output of the subtractor 456 and the expected output 458 (e.g., a matrix of zeroes). Then, the error metrics 426 or 428 may be optimized using the difference between the difference from the subtractor 456 and the expected output 458. For each entity 404 and each time window 408 granularity, the risk model 335 may define the transform blocks 450 at the input level 412 and transform blocks 452 at the high levels (e.g., the intermediate levels 414 and output level 416), thereby allowing the training to be performed end-to-end.

In some embodiments, the risk model 335 may be optimized by the model trainer 325 using a weighted average of the losses of each individual auto-encoders 432. The weights may be assigned to each error metric 424, 426, or 428 to optimize the auto-encoders 432 of the risk model 335. In some embodiments, the weights to the error metrics 424 from the transform blocks 450 in the input level 412 may be assigned the same value. The weights to the error metrics 426 from the transform blocks 452 in the intermediate level 414 may be assigned another value. The weights to the error metrics 428 from the transform blocks 452 in the final level 414 may be assigned another value. By assigning weights in this manner, the assignment of weights individually to each auto-encoder 432 may be circumvented. The issue arising may be that these manually supplied weights may affect the total model loss. In other words, the final loss for models using different loss weights may not be comparable with one another. Therefore, it may not be feasible to tune (in the hyper-parameter tuning sense) these weights unless there are labeled data available.

Figure 4H:
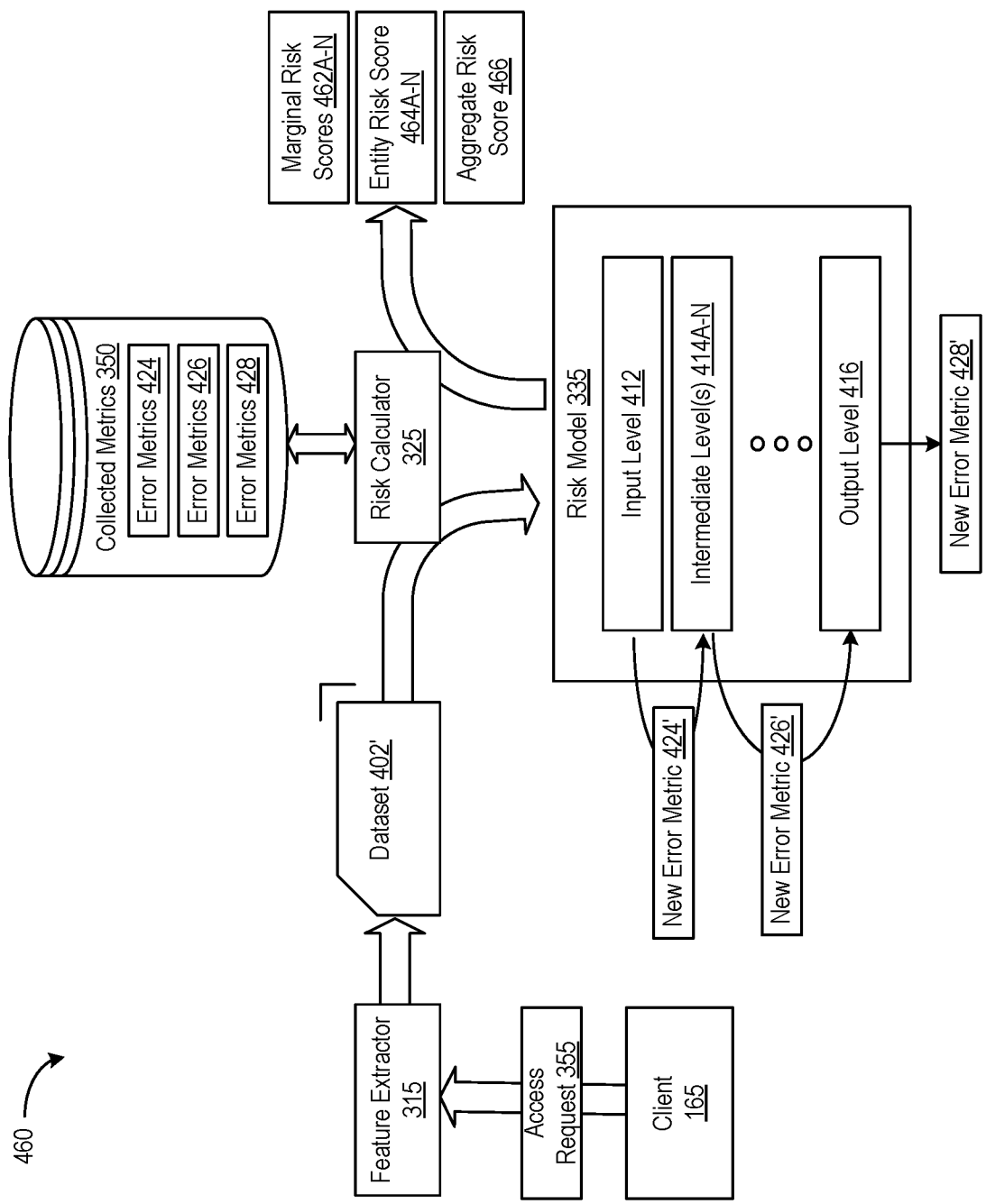
FIG. 4H is a sequence diagram of an inference phase in a system for determining risk metrics in accordance with an illustrative embodiment.

Referring now to FIG. 4H, depicted is a sequence diagram of an inference phase 460 in the system 300 for determining risk metrics. Under the inference phase 460, the feature extractor 315 may identify the dataset 402 associated with the access request 355 (as in the feature extraction phase 400). For example, the feature extractor 315 may access the history database 340 using the access request 355 to retrieve or identify the dataset 402. The dataset 402 may include entries describing access history and behavior by the client 165 with the service 310. Using the dataset 402, the feature extractor 315 may generate the dataset 402' using the dataset 402 to provide to the risk calculator 320. As discussed above, the dataset 402' may include a set of factors 404 with features 406 classified by time windows 408.

The risk calculator 320 may apply the risk model 335 (trained using the training data 345) to the dataset 402' associated with the access request 355 to generate various metrics. The metrics generated using the risk model 335 may include, for example: a set of marginal risk scores 462A-N (hereinafter generally referred to as marginal risk score 462), a set of entity risk scores 464A-N (hereinafter generally referred to as entity risk scores 464), and an aggregate risk score 464. Each marginal risk metric 462 (sometimes referred herein as a contributory metric) may indicate or correspond to an amount of deviation from the expected metric for the particular factor 404 over the respective time window 408. Each entity risk metric 464 (also sometimes referred herein as a contributory metric) may indicate or correspond to an amount of deviation from the expected metric for the particular factor 404 over all the time windows 408. The aggregate risk metric 466 (sometimes referred herein as an overall risk score) may indicate or correspond to an amount of deviation from the expected metric over all the factors 404 over all time windows 408 associated with the entire access request 355.

In applying the risk model 335, the risk calculator 320 may feed the dataset 402' to the risk model 335 via the input level 412. The risk calculator 320 may input the features 406 into the respective transform block 450 of the input level 412 based on the factors 404 and the time windows 408. For example, the risk calculator 320 may input the features 406 under the user behavior factor 404A of the first time window 408A-1 into the respective transform block 452 of the input level 412 for processing such metrics. Upon feeding the corresponding feature 406 of the dataset 402', the transform blocks 450 in the input level 412 may generate the margin risk scores 462. The risk calculator 320 may identify the marginal risk scores 462 generated by the transform blocks 450 of the input level 412. In some embodiments, the risk calculator 320 may identify a new error metric 424' generated by the loss function 454 in the transform blocks 450 as the marginal risk score 462.

Using the marginal risk scores 462, the risk calculator 320 may determine or generate other pertinent metrics. In some embodiments, the risk calculator 320 may compare the new error metrics 424' to the error metric 424 for the same factor 404 and time window 408 to determine an excessiveness metric. The error metric 424 may have been generated by the transform block 450 of the input level 412 using the training dataset 345. The excessiveness metric may indicate the amount of deviation from the previously generated error metric 424 for the same factor 404 and time window 408. In some embodiments, the risk calculator 320 may use the excessiveness metric as the marginal risk score 462. In some embodiments, the risk calculator 320 may determine a contribution metric for each factor 404, feature 406, and time window 408 based on the combination of the marginal risk scores 462 over the factor 404 and time window 408.

Continuing on, the risk calculator 320 may feed the marginal risk scores 462 generated by the transform blocks 450 of the input level 412 into the transform blocks 452 of the intermediate level 414. In feeding this, the risk calculator 320 may combine (e.g., aggregate or concatenate) the marginal risk scores 462 for a particular factor 404 over all the time windows 408. Upon combination, the risk calculator 320 may input the combined scores into the transformation block 452 for the factor 404 for processing of the scores. The transform blocks 452 of the intermediate level 414 may generate the entity risk score 464. The risk calculator 320 may identify the entity risk score 464 generated by the transform block 452 of the intermediate level 414. In some embodiments, the risk calculator 320 may identify new error metrics 426' generated by the transform block 452 as the entity risk score 464. In some embodiments, the risk calculator 320 may identify the error metrics 426' generated by the loss function 454 in the transform blocks 452 of the intermediate level 414 as the entity risk score 464.

Using the entity risk scores 464, the risk calculator 320 may determine or generate other related metrics. In some embodiments, the risk calculator 320 may compare the new error metrics 426' to the error metric 426 for the same factor 404 over all the time windows 408 to determine an excessiveness metric. The error metric 426 may have been generated by the transform block 452 of the intermediate level 414 using the training dataset 345. The excessiveness metric may indicate the amount of deviation from the previously generated results for the same factor 404 over all the time windows 408. In some embodiments, the risk calculator 320 may use the excessiveness metric as the entity risk score 464. In some embodiments, the risk calculator 320 may determine a contribution metric for each factor 404 based on the combination of the entity risk scores 464 over the factors 404 and time windows 408.

In addition, the risk calculator 320 may feed the entity risk scores 464 generated by the transform blocks 452 of the intermediate level 414 to the transform blocks 452 of the output level 416. In feeding this, the risk calculator 320 may combine (e.g., aggregate or concatenate) the entity risk scores 464 over all the factors 404 and the time windows 408. Upon combination, the risk calculator 320 may input the combined scores into the transformation block 452 of the output level 416 for processing. The transform blocks 452 of the output level 416 may generate the aggregate risk score 466. The risk calculator 320 may identify the aggregate risk score 466 generated by the transform block 452 of the output level 416. In some embodiments, the risk calculator 320 may identify new error metrics 428' generated by the transform block 452 as the aggregate risk score 466. In some embodiments, the risk calculator 320 may identify the error metric 428' generated by the loss function 454 in the transform blocks 452 in the output level 416 as the aggregate risk score 466.

Using the entity risk scores 464, the risk calculator 320 may determine or generate other related metrics. In some embodiments, the risk calculator 320 may compare the error metrics 428' to the error metrics 428 for over all the factors 404 and all the time windows 408 to determine an excessiveness metric. The error metrics 428 may have been generated by the transform block 452 of the output level 416 using the training dataset 345. The excessiveness metric may indicate the amount of deviation from the previously generated error metrics 428 over all the factors 404 and all the time windows 408. In some embodiments, the risk calculator 320 may use the excessiveness metric as the aggregate risk score 466.

In regards to contribution metrics, the metric may be defined as a function of the error metrics 424', 426', and 428'. The contribution metric may be, for example, the ratio of the absolute error of the factors 404 (or time windows 408) against the sum of absolute errors of all the input factors 404 (or time windows 408). Therefore, the sum of the feature contributions may equal 1 (or 100%). The same metric can be calculated regardless of the loss function. The contribution of a factor 404 (or time window 408) may give a concise indication of the proportion of the total anomaly coming from the input.

In regards to excessiveness metrics, the metric may indicate how unusual the error metrics 424', 426', or 428' of the factor 404 (or time window 408) may be compared to the training data 345. In other words, if the absolute error of the output is zero, then the corresponding excessiveness may also be zero since this would be a very low value for a normal feature. If, however, the absolute error of a factor 404 (or time window 408) is higher than the absolute errors of all the training data observations, then the corresponding excessiveness may be 1 (or 100).

To calculate the excessiveness metrics, additional data (e.g., the resultants 418, 420, and 422 and the error metrics 424, 426, and 428) may be collected (e.g., by the model trainer 325) from the training of the risk model 335. In particular, the training dataset 345 may be passed through the trained risk model 335. For each sample, the model trainer 325 may obtain the error metrics 424, 426, and 428 (or resultants 418, 420, and 422) during the training of the risk model 335. During the inference using new data, the risk calculator 320 may compare new error metrics 424, 426, and 428 against the distribution of error metrics generated from the training dataset 345. The risk calculator 320 may determine a normalized error metric based on the comparison. For example, the risk calculator 320 may identify a percentile to which the new error metrics 424, 426, and 428 belong to. The risk calculator 320 may also use a min-max scaling transformation to determine the normalized error metrics.

Both contribution and excessiveness metrics can be determined for each of the input into the risk model 335. For the overall reconstruction errors (e.g., the error metric 428), the risk calculator 320 may not calculate the contribution metric and may determine the excessiveness metrics. The contribution and excessiveness metrics may be contrasted with each other. For a certain factor 404 (or time window 408), the excessiveness metric may be relatively high but may have a lower contribution metric. For example, the current sample may be anomalous, and two of the input features may have high values. Feature A value may be simply unusual while feature B value may be extremely unusual. In this case, the excessiveness for both features may be very high since their values are unusual. However, the contribution from the feature B may be higher than the contribution metric from the feature A, and the sum of all feature contributions may sum up to 1 (or 100). In contrast, for a sample that is non-anomalous, all factors 404 may have expected values. One of the features (e.g., feature C), however, may have slightly increased, but may otherwise be within the range of expected values. In this case, all features can have low excessiveness given their low values. The contribution metric, however, from feature C may be high because that feature can be the one contributing the most to the anomality of the data sample.

Figure 4I:
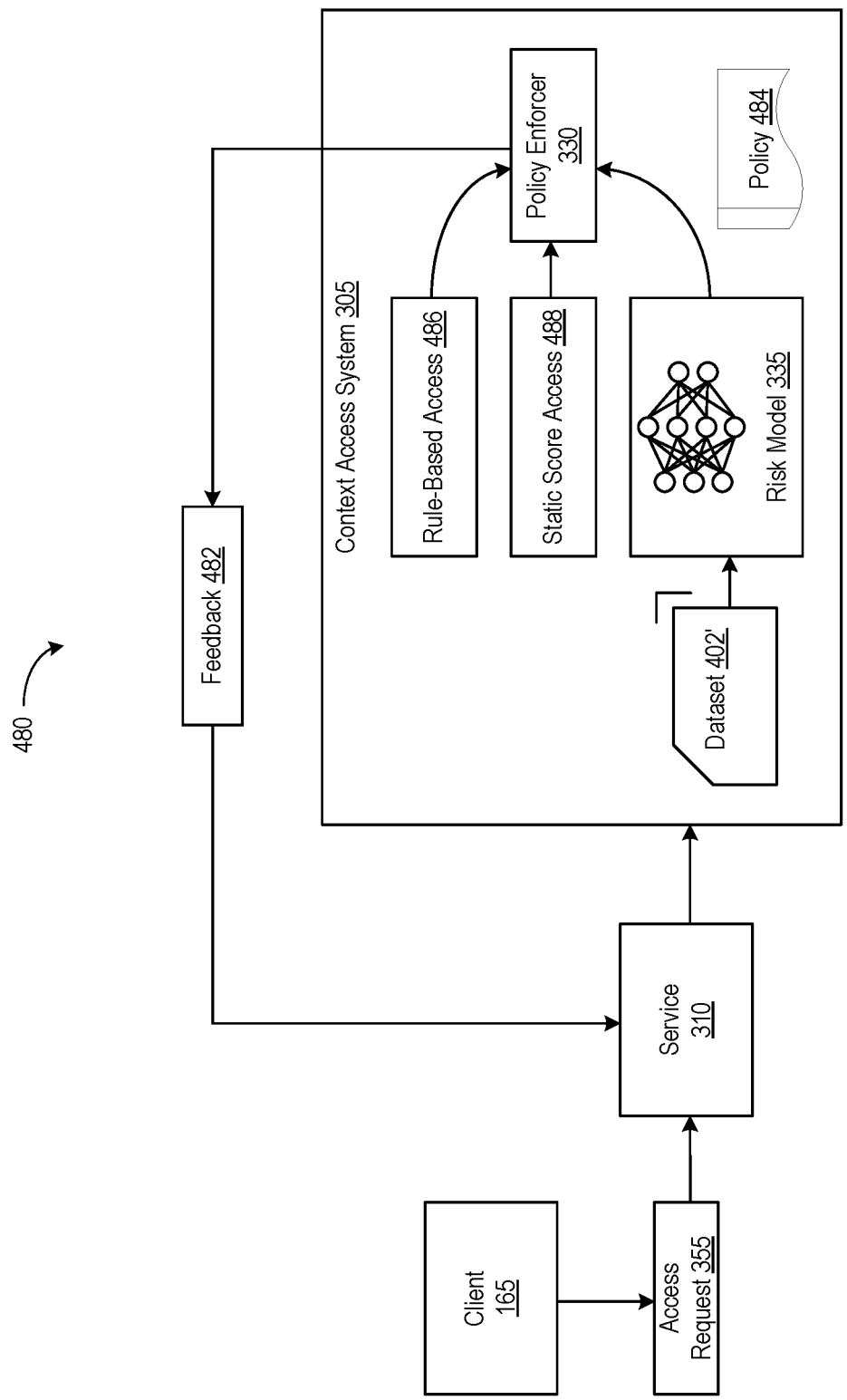
FIG. 4I is a sequence diagram of a policy enforcement phase in a system for determining risk metrics in accordance with an illustrative embodiment.

Referring now to FIG. 4I, depicted is a sequence diagram of a policy enforcement phase 480 in the system 300 for determining risk metrics. Under the policy enforcement phase 480, the policy enforcer 330 executing on the context access system 305 may perform or generate at least one feedback 482 (sometimes hereinafter referred to as a response). The generation of the feedback 482 may be in accordance with a policy 484 and the outputs of the risk model 335, such as the aggregate risk score 466, the entity risk scores 464, and the marginal risk scores 462, the contribution metrics, and/or the excessiveness metrics. The policy 484 (sometimes herein referred to as an access control policy) may identify, define, or otherwise include one or more threshold metrics for the outputs of the risk model 335 at which to permit or restrict access to the service 310 by the client 165 that sent the access request 355. In some embodiments, the threshold metrics of the policy 484 may include one or more values for entity risk scores 464, one or more values for the marginal risk scores 462. The policy 484 may specify the action to be performed by the client 165 or the service 310 via the feedback 482 based on satisfying or not satisfying the threshold metrics defined for the aggregate risk score 466, the entity risk scores 464, and the marginal risk scores 462.

In some embodiments, the threshold metrics for the policy 484 may define one or more values for contribution metrics, and one or more values for excessiveness metrics. The contribution and excessiveness metrics may be used in conjunction for access control policies. The two metrics may lend to a more fine-grained control to the administrator. For example, the policy 484 may specify that "if total risk excessiveness >90% or user risk excessiveness >90% and user risk contribution >40%, then require MFA" or "if user risk excessiveness >90% but user risk contribution <10%, then do not prompt for re-entry of user credentials." The policy 484 may specify the action to be performed by the client 165 or the service 310 via the feedback 482 based on satisfying or not satisfying the threshold metrics defined for contribution metrics and excessiveness metrics.

In some embodiments, the policy 484 may include other specifications to be used by the policy enforcer 330, such as at least one rule based access 486 or static score access 488, among others. The rule-based access 486 may specify a set of logical rules to apply to the access request 355 to determine whether to allow or restrict access to the service 310. The rules may define condition(s) and operand(s) in accordance to which to determine whether to allow or restrict access. The static score access 488 may include a score or metric for various attributes of the access request 355 or the client 165 in determining whether to allow or restrict access to the service 310. For example, the static score access 488 may attribute a lower score for a first time access by the client 165 to the service 310 and a higher score for repeated accesses from the client 165 to the service 310.

To determine whether to allow or restrict access in response to the access request 355, the policy enforcer 330 may compare the outputs to the threshold metrics defined by the policy 484. When the output satisfies the specifications (e.g., the threshold metrics, rule-based access 486, and the static score access 488) defined by the policy 484, the policy enforcer 330 may determine to allow access to the service 310. Based on the determination, the policy enforcer 330 may generate the feedback 482 to allow the client 165 to access the service 310. The feedback 482 may identify or include an indication of success in allowing the client 165 to access the service 310. The feedback 482 may include an action to be performed as specified by the policy 484. With the generation of the feedback 482, the policy enforcer 330 may transmit or otherwise provide the feedback 482 to the client 165 or the service 310.

On the other hand, when the output does not satisfy the specifications defined by the policy 484, the policy enforcer 330 may determine to restrict access to the service 310. Based on the determination, the policy enforcer 330 may generate the feedback 482 to restrict the client 165 from the service 310. The feedback 482 may include or identify an indication of failure in allowing the client 165 to access the service 310. The feedback 482 may include an action to be performed as specified by the policy 484. The feedback 482 may, for example, include a presentation of an alert at the client 165 or to an administrator of the service 310. The alert to the client 165 may include a prompt for the user to re-enter authentication credentials.

Figure 5:
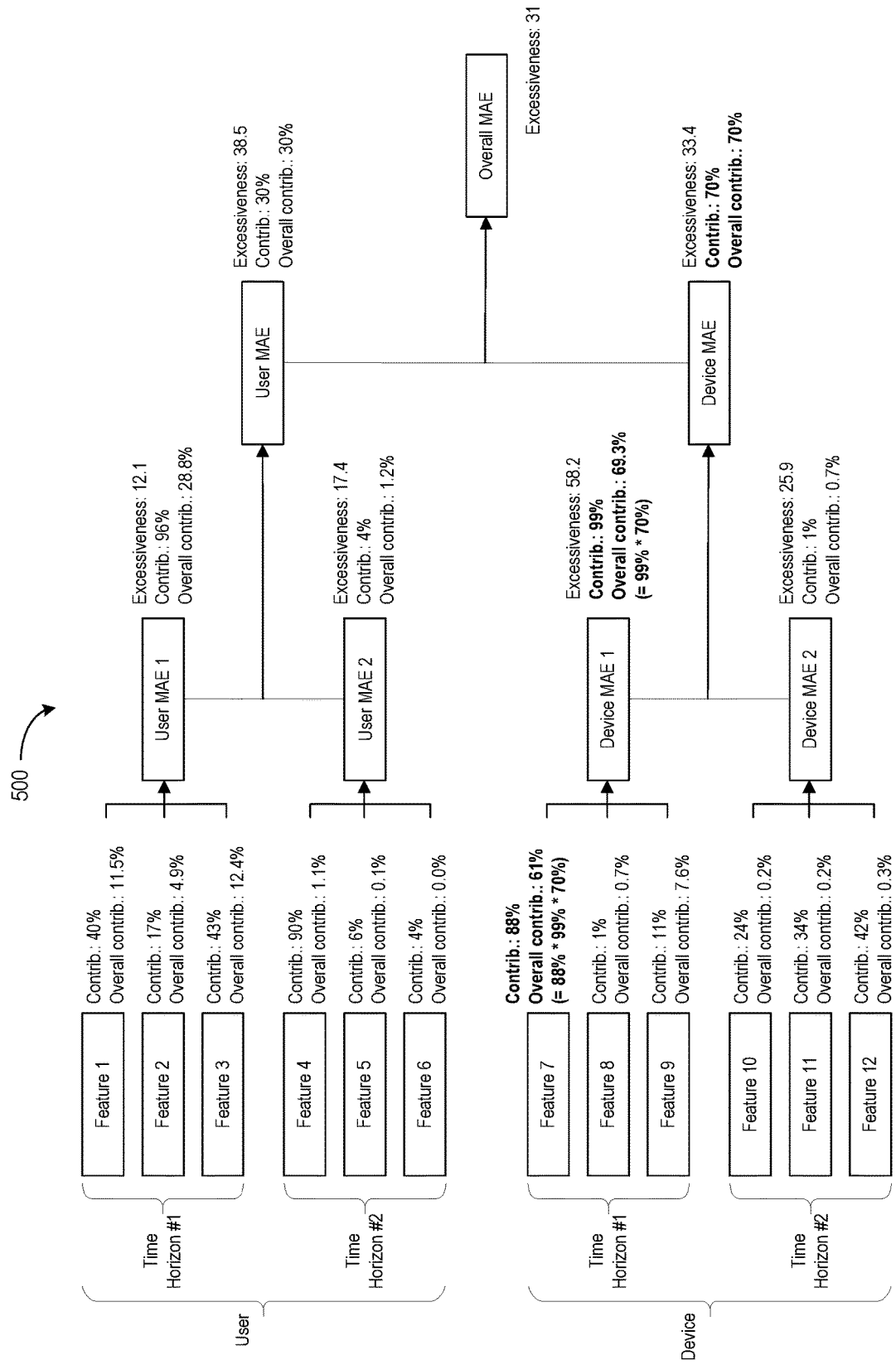
FIG. 5 is a block diagram of an example risk metrics over features and time windows determined in a system in accordance with an illustrative embodiment.

Referring now to FIG. 5, depicted is a block diagram of example risk metrics 500 across features and times determined using the system 300. The anomalies from the auto-encoders 432 of the risk model 335 may be deduced based on the reconstruction error of each factor 404. The reconstruction error (e.g., error metrics 424, 426, and 428) may be transformed to a more informative metric, with the contribution and excessiveness metrics. With the hierarchical arrangement of the auto-encoders 432, the technicalities may be complex.

For the raw input features 406, the model risk 355 may be used to calculate the contribution metrics and the excessiveness metrics using the reconstruction errors. Using the MAE of the transform blocks 450 of the input level 412, the contribution metrics and the excessiveness metrics may be determined in each entity (or factor 404). The MAEs may be concatenated per entity and fed to the transform blocks 452 of the intermediate level 414. In a similar manner, the contribution metrics and excessiveness metrics per entity may be calculated using the transform blocks 452 of the intermediate level 414. In addition, the contribution metrics and the excessiveness metrics of each entity and the overall excessiveness of the input may be determined using the MAE of the transform block 452 of the output level 416. The contribution metrics of the transform blocks 450 at the input level 412 may be normalized to determine the contribution of each feature 406 to the output MAE. This may be performed by multiplying the contribution from each feature with the contributions of all transform blocks 452 at the intermediate level 414. The contribution metrics may sum up to 1 (or 100%) across all entities and time horizons.

Turning to the example depicted, the dataset 402' may have two factors 404 related to user behavior and device behavior, each with three features and with two time windows, for a total of 12 input factors. The contribution metrics and the excessiveness metrics of each input factor are down at the input level 412, the intermediate level 414, and the output level 416. The overall contribution metric may be a multiplication of the respective contribution metrics with the contribution metrics of all the transform blocks 452 at the intermediate level 414 for a given factor 404. The highlighted (in bold letters) path shows the feature that contributes the most (61%) to the overall MAE and how this is calculated. The overall excessiveness of the input data sample is 31, which is somewhat low. This comes mostly from the device entity and almost exclusively by the 'time horizon #1' model. The raw input feature that contributes the most is 'feature #7'. This features contribute to 88% of the 'Device MAE 1' error and 61% to the overall error.

This example highlights the flexibility of the 'contribution' and 'excessiveness' metrics provided by the risk model 335. The administrator of the context access system 305 can use these metrics to define policies such as "if total risk excessiveness >50 and device excessiveness >80 and device contribution >50%, then may require MFA (multi-factor authentication)". The administrator can go one level lower and check if the most recent time horizon (say 'time horizon #1') is the biggest factor of the overall risk e.g. "if total risk excessiveness >50 and device MAE risk >80 and device MAE 1 overall contribution >80%, then may require MFA".

Figure 6:
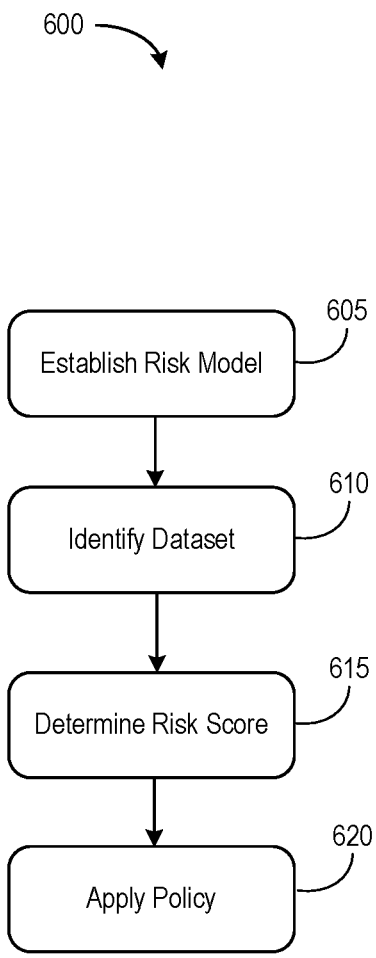
FIG. 6 is a flow diagram of a method of determining risk metrics in accordance with an illustrative embodiment.

Referring now to FIG. 6, depicted is a flow diagram of a method 600 of determining risk metrics. The method 600 may be implemented or performed by any of the components detailed above, such as the context access system 305 of the system 300. In brief overview, the context access system may establish a risk model (605). The context access system may identify a dataset (610). The context access system may determine a risk score (615). The context access system may apply a policy (620).

In further overview, the context access system (e.g., the context access system 305) may establish a risk model (e.g., the risk model 335) (605). The context access system may train the risk model using a training dataset (e.g., the training dataset 345). The risk model may have an input level (e.g., the input level 412), one or more intermediate levels (e.g., the intermediate level 414), and an output level (e.g., the output level 416). Each of the levels may have one or more transform blocks (e.g., the transform blocks 450 or 452). The levels of the risk model may be trained end-to-end using the training dataset. In training the risk model, the context access system may store and maintain the outputs (e.g., error metrics 424, 426, and 428) from the risk model in processing the training dataset.

The context access system may identify a dataset (e.g., the dataset 402) (610). The dataset may be identified in connection with an access request (e.g., the access request 355) to access a network environment (e.g., the service 310). The dataset may include entries assigned by entities (e.g., the factor 404), metrics (e.g., the features 406), and time windows (e.g., the time windows 408). The features may describe behavior related to the accessing of the network environment, such as a user behavior, a device behavior, a network address behavior, a location behavior, and an application behavior, among others.

The context access system may determine a risk score (e.g., the marginal risk scores 462, entity risk scores 464, and aggregate risk score 466) (620). The context access system may apply the dataset to the risk model. In applying the dataset, the context access system may process the dataset at each level, and can pass the resultants from one level to the next level. The context access system may also generate the contribution metric of each time horizon for a particular feature based on the marginal risk score across the time horizons for the feature. The context access system may also generate the contribution metric of each factor across the time horizon based on the entity risk scores across all the features. In addition, by comparing the risk scores to the previously determined scores, the context access system may determine the excessiveness metrics.

The context access system may apply a policy (e.g., the policy 484) (625). The policy may define specifications in regards to the risk scores and other metrics in determining whether to allow or restrict access to the network environment. In accordance with the risk scores (and related metrics) and the policy, the context access system may determine whether to allow or restrict access to the network environment. Based on the determination, the context access system may generate a response (e.g., the feedback 482). The response may indicate an action (e.g., allow or restrict) to perform in relation to the network environment.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of determining risk metrics, comprising:
providing, by a device, a risk model for a network environment, the risk model comprising a plurality of levels, the plurality of levels comprising:
an input level configured to process first datasets each corresponding to one of a plurality of features and one of a plurality of time windows, the first datasets comprising factors on access requests in the network environment;
an output level configured to generate a first aggregate risk metric of a first access request according to the datasets processed by the input level, the plurality of levels of the risk model updated using the first aggregate risk metric;
identifying, by the device, responsive to a second access request, a second dataset corresponding to the second access request over the plurality of features and the plurality of time windows;
determining, by the device, a second aggregate risk metric for the second access request by applying the second dataset to the risk model; and
generating, by the device, a response to the second access request in accordance with an access control policy and the second aggregate risk metric.

2. The method of claim 1, wherein the plurality of levels of the risk model further comprises an intermediate level configured to generate a plurality of risk metrics each generated according to the first datasets from one of the plurality of factors over the plurality of time windows processed by the input level, and wherein the output level of the risk model is further configured to generate the first aggregate risk metric using the plurality of risk metrics generated by the intermediate level, the first aggregate risk metric used to update the plurality of levels of the risk model through the input level, the intermediate level, and the output level.

3. The method of claim 1, wherein the output level of the risk model further comprises a subtractor configured to determine an aggregate error metric between a result generated by a set of transformation layers of the output level and an input to the set of transformation layers.

4. The method of claim 1, wherein providing the risk model further comprises updating, concurrent to updating the output level, the input level based at least on a comparison between (i) a result of processing a dataset of a corresponding factor of the plurality of factors and a corresponding time window of the plurality of time windows and (ii) an expected output from processing the dataset.

5. The method of claim 1, wherein providing the risk model further comprises establishing the risk model using a training dataset, the training dataset comprising metrics on access requests verified as safe for the network environment.

6. The method of claim 1, wherein the second dataset comprises second factors associated with the second access request, the second factors comprising at least one of a user, a device, an application, a network address, or a location.

7. The method of claim 1, wherein determining the second aggregate risk metric further comprises comparing a first result from the output level generated by applying the second dataset to the risk model, and a second result from the output level generated by applying the first datasets, to generate an excessiveness metric.

8. The method of claim 1, further comprising determining, by the device using the risk model, for a first feature of the plurality of features and for a first time window of the plurality of time windows, a contribution metric.

9. The method of claim 1, wherein generating the response further comprises comparing the second aggregate risk metric to a threshold metric defined by the access control policy.

10. The method of claim 1, wherein generating the response further comprises applying at least one of an access rule or a static score to the access control policy.

11. A device, comprising:
at least one processor coupled with memory, the at least one processor configured to:
provide a risk model for a network environment, the risk model comprising a plurality of levels, the plurality of levels comprising:
an input level configured to process first datasets each corresponding to one of a plurality of features and one of a plurality of time windows, the first datasets comprising factors on access requests in the network environment;
an output level configured to generate a first aggregate risk metric of a first access request according to the datasets processed by the input level, the plurality of levels of the risk model updated using the first aggregate risk metric;

identify, responsive to a second access request, a second dataset corresponding to the second access request over the plurality of features and the plurality of time windows;

determine a second aggregate risk metric for the second access request by applying the second dataset to the risk model; and generate a response to the second access request in accordance with an access control policy and the second aggregate risk metric.

12. The device of claim 11, wherein the plurality of levels of the risk model further comprises an intermediate level configured to generate a plurality of risk metrics each generated according to the first datasets from one of the plurality of features over the plurality of time windows processed by the input level, and wherein the output level of the risk model is further configured to generate the first aggregate risk metric using the plurality of risk metrics generated by the intermediate level, the first aggregate risk metric used to update the plurality of levels of the risk model through the input level, the intermediate level, and the output level.

13. The device of claim 11, wherein the output level of the risk model further comprises a subtractor configured to determine an aggregate error metric between a result generated by a set of transformation layers of the output level and an input to the set of transformation layers.

14. The device of claim 11, wherein the at least one processor is further configured to update, concurrent to updating the output level, the input level based at least on a comparison between (i) a result of processing a dataset of a corresponding feature of the plurality of features and a corresponding time window of the plurality of time windows and (ii) an expected output from processing the dataset.

15. The device of claim 11, wherein the at least one processor is further configured to establish the risk model using a training dataset, the training dataset comprising metrics on access requests verified as safe for the network environment.

16. The device of claim 11, wherein the at least one processor is further configured to compare a first result from the output level generated by applying the second dataset to the risk model, and a second result from the output level generated by applying the first datasets, to generate an excessiveness metric.

17. The device of claim 11, wherein the at least one processor is further configured to determine, using the risk model, for a first feature of the plurality of features and for a first time window of the plurality of time windows, a contribution metric.

18. The device of claim 11, wherein the at least one processor is further configured to apply at least one of an access rule or a static score to the access control policy.

19. A non-transitory computer readable medium storing instructions that when executed cause at least one processor to:

provide a risk model for a network environment, the risk model comprising a plurality of levels, the plurality of levels comprising:
an input level configured to process first datasets each corresponding to one of a plurality of features and one of a plurality of time windows, the first datasets comprising factors on access requests in the network environment;
an output level configured to generate a first aggregate risk metric of a first access request according to the datasets processed by the input level, the plurality of levels of the risk model updated using the first aggregate risk metric;

identify, responsive to a second access request, a second dataset corresponding to the second access request over the plurality of features and the plurality of time windows;

determine a second aggregate risk metric for the second access request by applying the second dataset to the risk model; and generate a response to the second access request in accordance with an access control policy and the second aggregate risk metric.

20. The non-transitory computer readable medium of claim 19, wherein the instructions cause the at least one processor to update, concurrent to updating the output level, the input level based at least on a comparison between (i) a result of processing a dataset of a corresponding feature of the plurality of features and a corresponding time window of the plurality of time windows and (ii) an expected output from processing the dataset.

* * * * *